United States Patent
Yasui et al.

(10) Patent No.: US 8,086,770 B2
(45) Date of Patent: Dec. 27, 2011

(54) COMMUNICATION APPARATUS WITH DATA DISCARD FUNCTIONS AND CONTROL METHOD THEREFOR

(75) Inventors: Takanori Yasui, Kawasaki (JP); Hideki Shiono, Kawasaki (JP); Hirofumi Fujiyama, Kawasaki (JP); Satoshi Tomie, Kawasaki (JP); Kenji Fukunaga, Kawasaki (JP); Tamotsu Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 144 days.

(21) Appl. No.: 12/320,533

(22) Filed: Jan. 28, 2009

(65) Prior Publication Data

US 2009/0300296 A1 Dec. 3, 2009

(30) Foreign Application Priority Data

May 27, 2008 (JP) ................................. 2008-138181

(51) Int. Cl.
G06F 13/10 (2006.01)
H04L 12/26 (2006.01)
H04L 12/54 (2006.01)

(52) U.S. Cl. .............. 710/60; 710/45; 710/57; 370/229; 370/428

(58) Field of Classification Search .................... None
See application file for complete search history.

(56) References Cited

U.S. PATENT DOCUMENTS

| | | | |
|---|---|---|---|
| 5,282,203 A | 1/1994 | Oouchi | |
| 5,892,762 A * | 4/1999 | Okuda et al. | 370/395.42 |
| 7,349,330 B1 * | 3/2008 | Hayakawa et al. | 370/229 |
| 2003/0103451 A1 * | 6/2003 | Lutgen et al. | 370/229 |
| 2008/0147923 A1 * | 6/2008 | Renahy et al. | 710/62 |

OTHER PUBLICATIONS

Patent Abstracts of Japan (Japanese Publication No. 2006-135762; Publication Date: May 25, 2006).
Patent Abstracts of Japan (Japanese Publication No. 2003-188912; Publication Date: Jul. 4, 2003).
Patent Abstracts of Japan (Japanese Publication No. 04-257145$^x$; Publication Date: Sep. 11, 1992).
Patent Abstracts of Japan (Japanese Publication No. 2007-065948; Publication Date: Mar. 15, 2007).
Patent Abstracts of Japan (Japanese Publication No. 2007-134936; Publication Date: May 31, 2007).
Patent Abstracts of Japan, Publication No. 2009-021872, Publication Date Jan. 29, 2009.

* cited by examiner

Primary Examiner — Ilwoo Park
(74) Attorney, Agent, or Firm — Fujitsu Patent Center

(57) ABSTRACT

In a communication apparatus, a write controller writes received data in a temporary memory which serves as short-time storage. A read controller reads data out of the temporary memory. A discard controller controls discard operation of the data read out of the temporary memory.

11 Claims, 34 Drawing Sheets

FIG.10

401b — VACANCY MANAGEMENT MEMORY

| ADDRESS | DATA |
|---|---|
| 0 | (UNAVAILABLE) |
| 1 | (UNAVAILABLE) |
| 2 | (UNAVAILABLE) |
| 3 | (UNAVAILABLE) |
| 4 | (UNAVAILABLE) |
| 5 | (UNAVAILABLE) |
| 6 | (UNAVAILABLE) |
| 7 | (UNAVAILABLE) |
| 8 | (UNAVAILABLE) |
| 9 | (UNAVAILABLE) |
| 10 | (UNAVAILABLE) |
| 11 | (UNAVAILABLE) |
| 12 | 12 (AVAILABLE) |
| 13 | 13 (AVAILABLE) |
| 14 | 14 (AVAILABLE) |

| ADDRESS CHAIN MANAGEMENT MEMORY | |
|---|---|
| ADDRESS | DATA |
| 0 | NEXT ADDRESS=1 |
| 1 | NEXT ADDRESS=2 |
| 2 | NEXT ADDRESS=3 |
| 3 | NEXT ADDRESS=4 |
| 4 | NEXT ADDRESS=5 |
| 5 | NEXT ADDRESS=6 |
| 6 | NEXT ADDRESS=7 |
| 7 | NEXT ADDRESS=8 |
| 8 | NEXT ADDRESS=9 |
| 9 | NEXT ADDRESS=10 |
| 10 | NEXT ADDRESS=11 |
| 11 | NEXT ADDRESS=NONE |
| 12 | VACANT |
| 13 | VACANT |
| 14 | VACANT |

TOP ADDRESS MANAGEMENT MEMORY — 401d

| PORT | CLASS | TOP ADDRESS |
|------|-------|-------------|
| 0 | A | INITIAL VALUE |
| 0 | B | INITIAL VALUE |
| 0 | C | INITIAL VALUE |
| 0 | D | TOP ADDRESS=0 |
| ⋮ | ⋮ | ⋮ |
| n | A | INITIAL VALUE |
| n | B | INITIAL VALUE |
| n | C | INITIAL VALUE |
| n | D | INITIAL VALUE |

FIG. 13

| | | 401e |
|---|---|---|
| END ADDRESS MANAGEMENT MEMORY | | |
| PORT | CLASS | END ADDRESS |
| 0 | A | *INITIAL VALUE* |
| 0 | B | *INITIAL VALUE* |
| 0 | C | *INITIAL VALUE* |
| 0 | D | *END ADDRESS=11* |

⋮ ⋮ ⋮

| | | |
|---|---|---|
| n | A | *INITIAL VALUE* |
| n | B | *INITIAL VALUE* |
| n | C | *INITIAL VALUE* |
| n | D | *INITIAL VALUE* |

| VACANCY MANAGEMENT MEMORY ||
|---|---|
| ADDRESS | DATA |
| 0 | 0 (AVAILABLE) |
| 1 | 1 (AVAILABLE) |
| 2 | 2 (AVAILABLE) |
| 3 | 3 (AVAILABLE) |
| 4 | 4 (AVAILABLE) |
| 5 | (UNAVAILABLE) |
| 6 | (UNAVAILABLE) |
| 7 | (UNAVAILABLE) |
| 8 | (UNAVAILABLE) |
| 9 | (UNAVAILABLE) |
| 10 | (UNAVAILABLE) |
| 11 | (UNAVAILABLE) |
| 12 | 12 (AVAILABLE) |
| 13 | 13 (AVAILABLE) |
| 14 | 14 (AVAILABLE) |

| ADDRESS CHAIN MANAGEMENT MEMORY ||
|---|---|
| ADDRESS | DATA |
| 0 | VACANT |
| 1 | VACANT |
| 2 | VACANT |
| 3 | VACANT |
| 4 | VACANT |
| 5 | NEXT ADDRESS=6 |
| 6 | NEXT ADDRESS=7 |
| 7 | NEXT ADDRESS=8 |
| 8 | NEXT ADDRESS=9 |
| 9 | NEXT ADDRESS=10 |
| 10 | NEXT ADDRESS=11 |
| 11 | NEXT ADDRESS=NONE |
| 12 | VACANT |
| 13 | VACANT |
| 14 | VACANT |

TOP ADDRESS MANAGEMENT MEMORY — 402d

| PORT | CLASS | TOP ADDRESS |
|---|---|---|
| 0 | A | INITIAL VALUE |
| 0 | B | INITIAL VALUE |
| 0 | C | INITIAL VALUE |
| 0 | D | TOP ADDRESS=5 |

⋮ ⋮ ⋮

| | | |
|---|---|---|
| n | A | INITIAL VALUE |
| n | B | INITIAL VALUE |
| n | C | INITIAL VALUE |
| n | D | INITIAL VALUE |

FIG.18

END ADDRESS MANAGEMENT MEMORY — 402e

| PORT | CLASS | END ADDRESS |
|---|---|---|
| 0 | A | INITIAL VALUE |
| 0 | B | INITIAL VALUE |
| 0 | C | INITIAL VALUE |
| 0 | D | END ADDRESS=11 |
| ⋮ | ⋮ | ⋮ |
| n | A | INITIAL VALUE |
| n | B | INITIAL VALUE |
| n | C | INITIAL VALUE |
| n | D | INITIAL VALUE |

FIG.21

VACANCY MANAGEMENT MEMORY 403b

| ADDRESS | DATA |
|---|---|
| 0 | (UNAVAILABLE) |
| 1 | 1 (AVAILABLE) |
| 2 | 2 (AVAILABLE) |
| 3 | 3 (AVAILABLE) |
| 4 | 4 (AVAILABLE) |
| 5 | (UNAVAILABLE) |
| 6 | (UNAVAILABLE) |
| 7 | (UNAVAILABLE) |
| 8 | (UNAVAILABLE) |
| 9 | (UNAVAILABLE) |
| 10 | (UNAVAILABLE) |
| 11 | (UNAVAILABLE) |
| 12 | (UNAVAILABLE) |
| 13 | (UNAVAILABLE) |
| 14 | (UNAVAILABLE) |
| ⋮ | ⋮ |

FIG.22

ADDRESS CHAIN MANAGEMENT MEMORY 403c

| ADDRESS | DATA |
|---|---|
| 0 | NEXT ADDRESS=NONE |
| 1 | VACANT |
| 2 | VACANT |
| 3 | VACANT |
| 4 | VACANT |
| 5 | NEXT ADDRESS=6 |
| 6 | NEXT ADDRESS=7 |
| 7 | NEXT ADDRESS=8 |
| 8 | NEXT ADDRESS=9 |
| 9 | NEXT ADDRESS=10 |
| 10 | NEXT ADDRESS=11 |
| 11 | NEXT ADDRESS=12 |
| 12 | NEXT ADDRESS=13 |
| 13 | NEXT ADDRESS=14 |
| 14 | NEXT ADDRESS=NONE |
| ⋮ | ⋮ |

FIG.23

TOP ADDRESS MANAGEMENT MEMORY — 403d

| PORT | CLASS | TOP ADDRESS VALUE |
|---|---|---|
| 0 | A | INITIAL VALUE |
| 0 | B | INITIAL VALUE |
| 0 | C | TOP ADDRESS=0 |
| 0 | D | TOP ADDRESS=5 |

⋮  ⋮  ⋮

| | | |
|---|---|---|
| n | A | INITIAL VALUE |
| n | B | INITIAL VALUE |
| n | C | INITIAL VALUE |
| n | D | INITIAL VALUE |

| END ADDRESS MANAGEMENT MEMORY | | |
|---|---|---|
| PORT | CLASS | END ADDRESS VALUE |
| 0 | A | INITIAL VALUE |
| 0 | B | INITIAL VALUE |
| 0 | C | END ADDRESS=0 |
| 0 | D | END ADDRESS=14 |

⋮ ⋮ ⋮

| | | |
|---|---|---|
| n | A | INITIAL VALUE |
| n | B | INITIAL VALUE |
| n | C | INITIAL VALUE |
| n | D | INITIAL VALUE |

FIG. 28
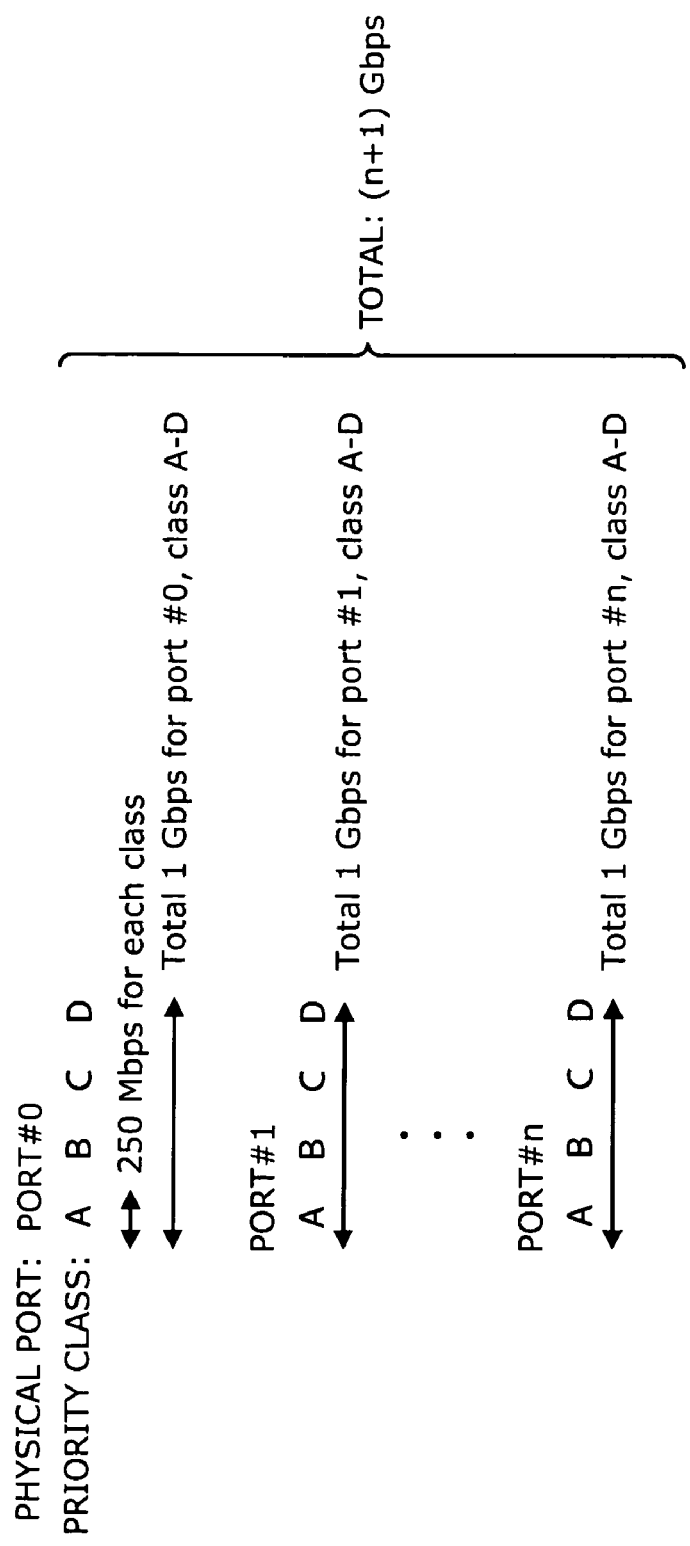
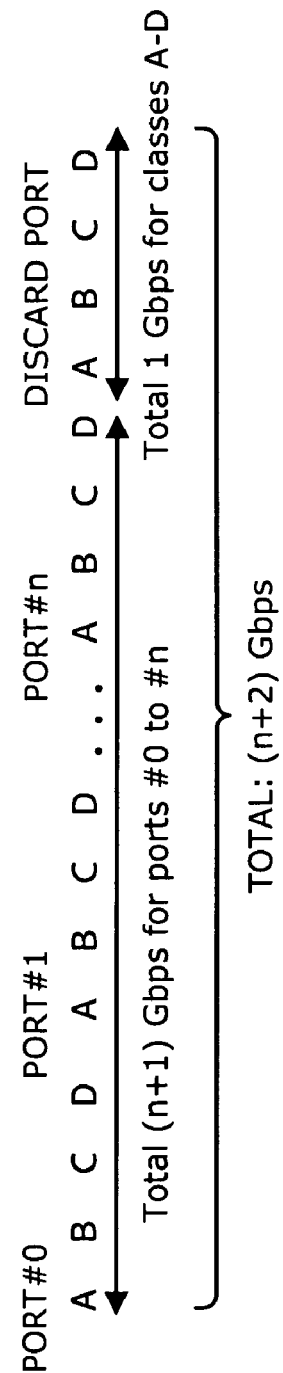

COMMUNICATION APPARATUS WITH DATA DISCARD FUNCTIONS AND CONTROL METHOD THEREFOR

CROSS-REFERENCE TO RELATED APPLICATIONS

This application is based upon and claims the benefits of priority of the prior Japanese Patent Application No. 2008-138181, filed on May 27, 2008, the entire contents of which are incorporated herein by reference.

FIELD

The embodiments discussed herein are related to a communication apparatus and a control method therefor, and related to a communication apparatus, as well as to its control method, that has temporary storage for storing received data before it is transmitted to a peer communication apparatus.

BACKGROUND

A network system is formed from communication devices that deliver data packets originated from terminal devices to their respective destinations over communication links. Conventionally, those communication devices include internal buffer storage to prevent congestion and enhance the efficiency of data transfer. Since the data capacity of a buffer is not infinite, an overwhelming amount of incoming packets would clog up the buffer, resulting in a loss of subsequent packets.

As an example of a conventional technique, Japanese Laid-open Patent Publication No. 2006-135762 proposes a packet transmission device having a front-end traffic policer that monitors and controls the amount of incoming packets by discarding some of them before they are entered to a buffer. The proposed technique enables priority-based data buffering, which prevents the buffer from being occupied by low-priority data. The proposed technique also offers priority-based scheduling of packet traffic, as well as a service with a guaranteed bandwidth defined in terms of "committed information rate" (CIR), the minimum transmission rate guaranteed even in the event of network congestion.

As another example of a conventional technique, Japanese Laid-open Patent Publication No. 2003-188912 proposes a method for controlling buffers. According to this publication, data stored in a buffer will be discarded if the length of a data queue exceeds a threshold.

As yet another example of a conventional technique, Japanese Laid-open Patent Publication No. 4-257145 (1992) proposes a communication control device that observes the amount of incoming packet flow for each logical channel signal. The proposed device puts a mark on a packet if its data size exceeds a first threshold defined on the basis of the sending subscriber's declaration. Further, the proposed device discards packets if the packet flow exceeds a second threshold, which is greater than the first threshold.

As still another example of a conventional technique, Japanese Laid-open Patent Publication No. 2007-65948 proposes a buffer memory device with a double buffer structure. Data is written in one buffer at a first operating frequency, while another buffer outputs data at a second operating frequency to transfer the data to a FIFO memory.

As a further example of a conventional technique, Japanese Laid-open Patent Publication No. 2007-134936 proposes a DMA controller that measures a time overhead of a data transfer operation when transferring received packets to a buffer. If the observed time overhead is greater than a threshold, the DMA controller cancels the data transfer.

The above-described approach using a front-end policer, however, may increase the cost of communication devices because a large amount of circuitry is necessary to implement it. But simply abandoning a front-end bandwidth control mechanism means allowing any class of packets to enter the buffer without control. As a result, the buffer could be occupied by low-priority packets, failing to satisfy a specified CIR of high-priority packets.

FIG. 34 illustrates a case where a guaranteed CIR may not be maintained in a conventional system because of its lack of packet discard functions. The illustrated conventional station 90 has a write controller 92 and a packet buffer 93, but no mechanisms for discarding packets (data). Accordingly, every packet that has arrived at the station 90 will later be transmitted unless the packet buffer 93 encounters overflow.

That is, the illustrated station 90 allows incoming packets to go straight into the packet buffer 93 without limit, in the order that they have arrived. The received packets accumulate in the packet buffer 93 without being discarded until its maximum capacity is reached. Once the capacity limit is hit, the subsequent packets will be lost.

Basically the packet buffer 93 never experiences overflow in the case where the output rate of packets is equal to or higher than the input rate of same. But in the case where the input rate exceeds the output rate, excessive incoming packets will overflow the packet buffer 93, resulting in a loss of packets.

Another problem is that the station 90 is unable to provide priority-based scheduling on the output side or to guarantee the bandwidth for specified CIR. This is because the station's input interface sends received packets to the packet buffer 93 simply in the order of arrival, regardless of their priorities.

The above-noted problems arise in at least the following two conditions:

(a) Input Link Bandwidth>Output Link Bandwidth

This condition causes accumulation of data in the buffer.

(b) Lack of Policing Functions for Input Packets

Without packet policers or other discard mechanisms to control input bandwidths based on the priority of traffic, the buffer has to accept all incoming packets in the order that they arrive. The buffer may be occupied by low-priority data, and when this happens, output policing is useless in transmitting high-priority packets in preference to other packets to maintain a guaranteed CIR. This issue will be discussed in detail below.

Now let "class C" and "class D" represent two different priority classes, where class C has a higher priority over class D. The station has a scheduler that achieves output policing to guarantee the CIR of class-C traffic by reading buffer data of class-C packets in preference to class-D packets. However, the above-noted conditions (a) and (b) allow a burst of class-D packets to occupy the buffer. In such a case, the scheduler placed at the buffer output cannot read out high-priority, class-C packets at a sufficient rate. Accordingly, the overstuffed buffer begins to reject newly received class-C packets, resulting in a loss of high-priority packets. In other words, the conditions (a) and (b) paralyzes the scheduler and thus invites degradation of CIR or other problems.

Referring again to FIG. 34, a more specific example will be described below. Suppose now that the station 90 receives both class-C packets and class-D packets at the rate of 100 Mbps for each. The total incoming traffic thus amounts to 200 Mbps. Also suppose that the station 90 has to offer a CIR of 100 Mbps for class-C traffic and that of 50 Mbps for class-D traffic. It is assumed that the output link bandwidth is 150 Mbps. Again, class-C packets have a higher priority over class-D packets.

Note that input bandwidth is greater than output bandwidth in the present example. Accordingly, the amount of packets stored in the packet buffer 93 increases with time. More precisely, the amount of class-C packets in the packet buffer 93 does not change because the input and output bandwidths of class C are both 100 Mbps. It is the class-D packets that actually increases in the packet buffer 93. Since the class-D traffic has a larger input bandwidth than its output bandwidth, class-D packets gradually consume free space of the packet buffer 93 and eventually causes a buffer overflow.

Once the overflow level is reached, the packet buffer 93 can only produce a limited free space for a new frame each time a stored packet is read out. The produced space is used by a packet received at the moment when that space becomes available.

The present example assumes that class-C and class-D packets have the same frame length, and that they enter the packet buffer 93 evenly over time. It is also assumed that the packet buffer 93 accepts class-C packets at a probability of 50 percent on average. Received class-C packets make their way to the packet buffer 93, together with received class-D packets, and those packets are permitted to enter the packet buffer 93 at 50% probability. The remaining packets are lost. Also, the survived class-C packets can only have at most 50% of the output bandwidth of the station 90. Since, as mentioned above, the output link bandwidth is 150 Mbps, the output rate of class-C packets will be 75 Mbps (=150/2). This means that the station 90 cannot satisfy the specified CIR of class C, which is 100 Mbps. On the other hand, the remaining output bandwidth is used by the class-D packet traffic, meaning that class-D packets are transmitted at 75 Mbps, which is well above the guaranteed CIR of class D.

The above result is based on a simple probability model, and the actual behavior of a station may vary depending on the packet lengths and other specific conditions. In some implementations, the station handles packets having different lengths and different priorities. Conventional stations are likely to experience the above-noted problems of CIR degradation in such circumstances.

SUMMARY

According to an aspect of the invention, a communication apparatus has the following elements: a temporary memory to temporarily store data; a write controller to write received data in the temporary memory; a read controller to read the stored data out of the temporary memory; and a discard controller to perform a discard operation that discards the data read out of the temporary memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates a vacancy management memory at the moment when the received packets of the first condition have just been written in the packet buffer;
FIG. 11 illustrates an address chain management memory at the moment when the received packets of the first condition have just been written in the packet buffer;
FIG. 12 illustrates a top address management memory at the moment when the received packets of the first condition have just been written in the packet buffer;
FIG. 13 illustrates an end address management memory at the moment when the received packets of the first condition have just been written in the packet buffer;
FIG. 15 illustrates the vacancy management memory at the moment when some packets of the first condition have just been discarded;
FIG. 16 illustrates the address chain management memory at the moment when some packets of the first condition have just been discarded;
FIG. 17 illustrates the top address management memory at the moment when some packets of the first condition have just been discarded;
FIG. 18 illustrates the end address management memory at the moment when some packets of the first condition have just been discarded;
FIG. 21 illustrates the vacancy management memory at the moment when the received packets of the second condition have just been written in the packet buffer;
FIG. 22 illustrates the address chain management memory at the moment when the received packets of the second condition have just been written in the packet buffer;
FIG. 23 illustrates the top address management memory at the moment when the received packets of the second condition have just been written in the packet buffer;
FIG. 24 illustrates the end address management memory at the moment when the received packets of the second condition have just been written in the packet buffer;
FIG. 28 illustrates input and output link bandwidths in the second embodiment.

DESCRIPTION OF EMBODIMENT(S)

Figure 1:
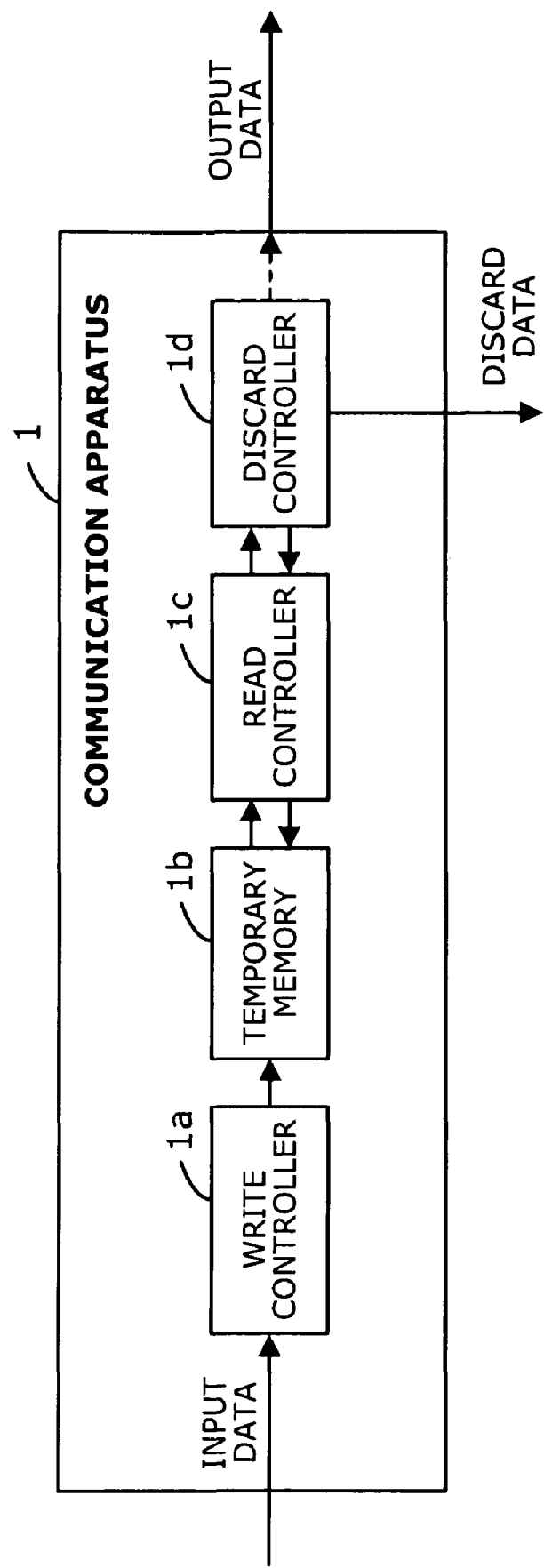
FIG. 1 provides an overview of an embodiment.

Embodiments of the present invention will be described below with reference to the accompanying drawings, wherein like reference numerals refer to like elements throughout.

FIG. 1 provides an overview of a communication apparatus 1 according to an embodiment. This communication apparatus 1 receives data and stores the received data temporarily in a buffer before forwarding it to another communication apparatus (not illustrated). To avoid buffer overflow, the proposed communication apparatus 1 includes a write controller 1a, a temporary memory 1b, a read controller 1c, and a discard controller 1d.

The write controller 1a performs write operations to the temporary memory 1b to store data that the communication apparatus 1 has received. The temporary memory 1b serves as short-time storage for the received data written by write controller 1a. This temporary memory 1b may be implemented using, for example, static random access memory (SRAM) or other memory devices suitable for data buffering purposes, with a sufficiently high access speed with respect to the packet transmission rates.

The read controller 1c reads stored data out of the temporary memory 1b for transmission over a network (not illustrated) to which the communication apparatus 1 is attached. That is, the data received by the communication apparatus 1 will be transmitted to the network after being stored temporarily in the temporary memory 1b. The network delivers the transmitted data to its destination terminal. The discard controller 1d controls discard operation of the data read out of the temporary memory 1b, thereby increasing free storage space in the temporary memory 1b.

In operation of the above communication apparatus 1, the write controller 1a writes newly received data in the temporary memory 1b, while the read controller 1c reads stored data out of the temporary memory 1b. The discard controller 1d discards some of the data read out of the temporary memory 1b if so instructed.

The discard controller 1d prevents buffer overflow by discarding data. The proposed arrangement contributes to cost-effective design of a communication apparatus since it eliminates the need for front-end bandwidth control circuits which need a large number of components.

First Embodiment

Figure 2:
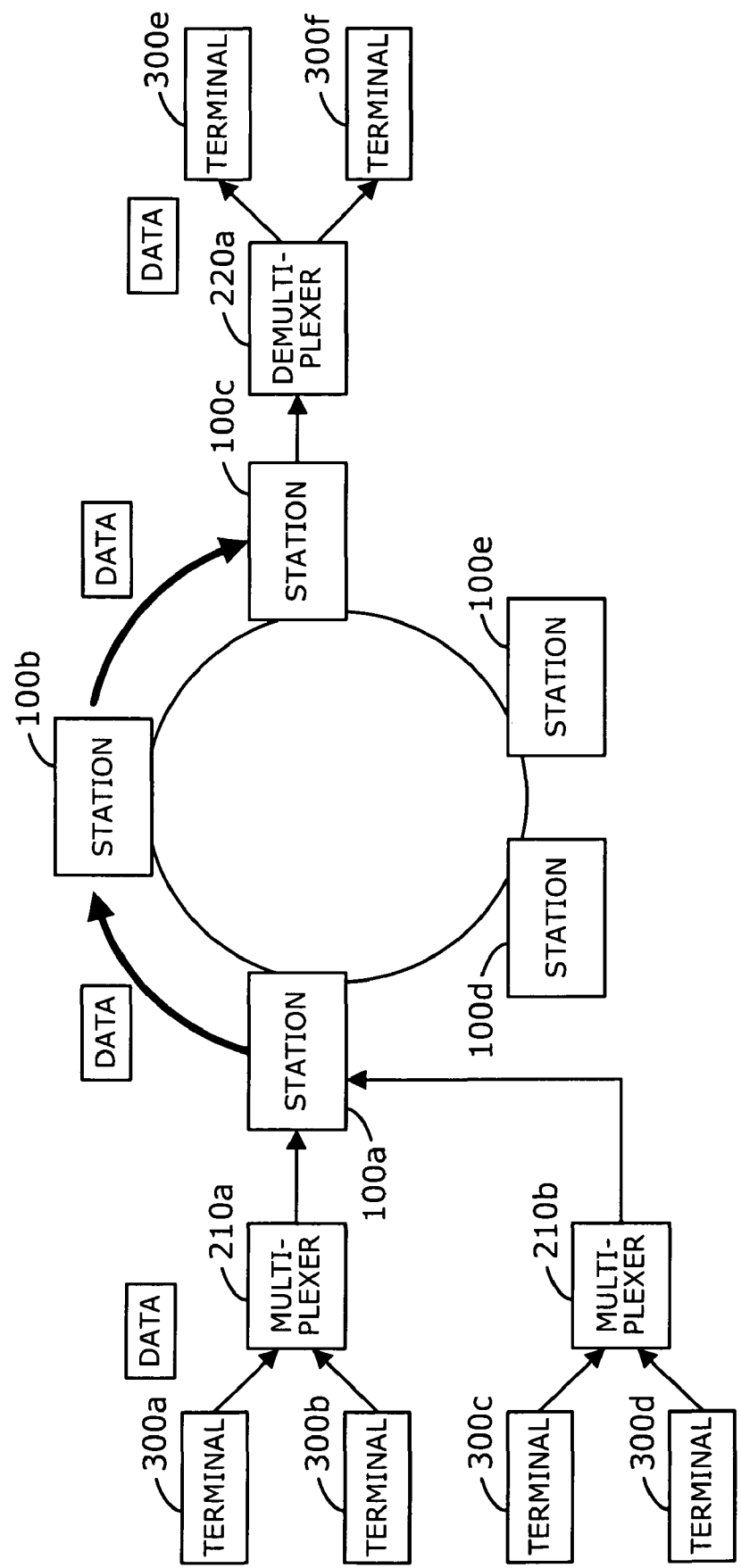
FIG. 2 illustrates a structure of a communications system.

This section describes a first embodiment. FIG. 2 illustrates a structure of a communications system. According to this embodiment, the communications system includes a plurality of communication apparatuses (e.g., stations) that exchange data in packet form, so as to permit terminals to communicate data to each other.

The communications system illustrated in FIG. 2 includes the following network elements: stations 100a, 100b, 100c, 100d, and 100e, multiplexers 210a and 210b, a demultiplexer 220a, and terminals 300a, 300b, 300c, 300d, 300e, and 300f.

The stations 100a to 100e serve as intermediate nodes that deliver data packets sent by the terminals 300a to 300f. All those stations 100a to 100e have hardware and software structures and functions similar to those of a station 100 described later.

The multiplexers 210a and 210b collect data from a terminal 300a or the like and forward them to the station 100a in multiplexed form. The demultiplexer 220a decomposes the multiplexed data back into individual data. The terminals 300a to 300f are user terminals. The illustrated communications system allows the terminals 300a to 300f to send and receive data to/from each other.

The illustrated system operates as follows. Suppose, for example, that one terminal 300a has sent out data with a destination address specifying another terminal 300e. This data is collected by the multiplexer 210a and multiplexed together with other data from, for example, a terminal 300b to send them together to the station 100a. This multiplexed data is forwarded from the station 100a to its neighboring station 100b, then to another station 100c, thus arriving at the demultiplexer 220a. The demultiplexer 220a demultiplexes the multiplexed data into individual pieces of data, thus extracting the data originated by the source terminal 300a and delivering it to the destination terminal 300e.

Each piece of data (or a packet containing such data) transmitted between terminals 300a to 300f has a specific priority class designated by the symbol A, B, C, or D. Class A refers to the highest priority, which is followed by class B, class C, and class D in that order. The stations 100a to 100d, 100e handle data packets according to their priority classes.

Figure 3:
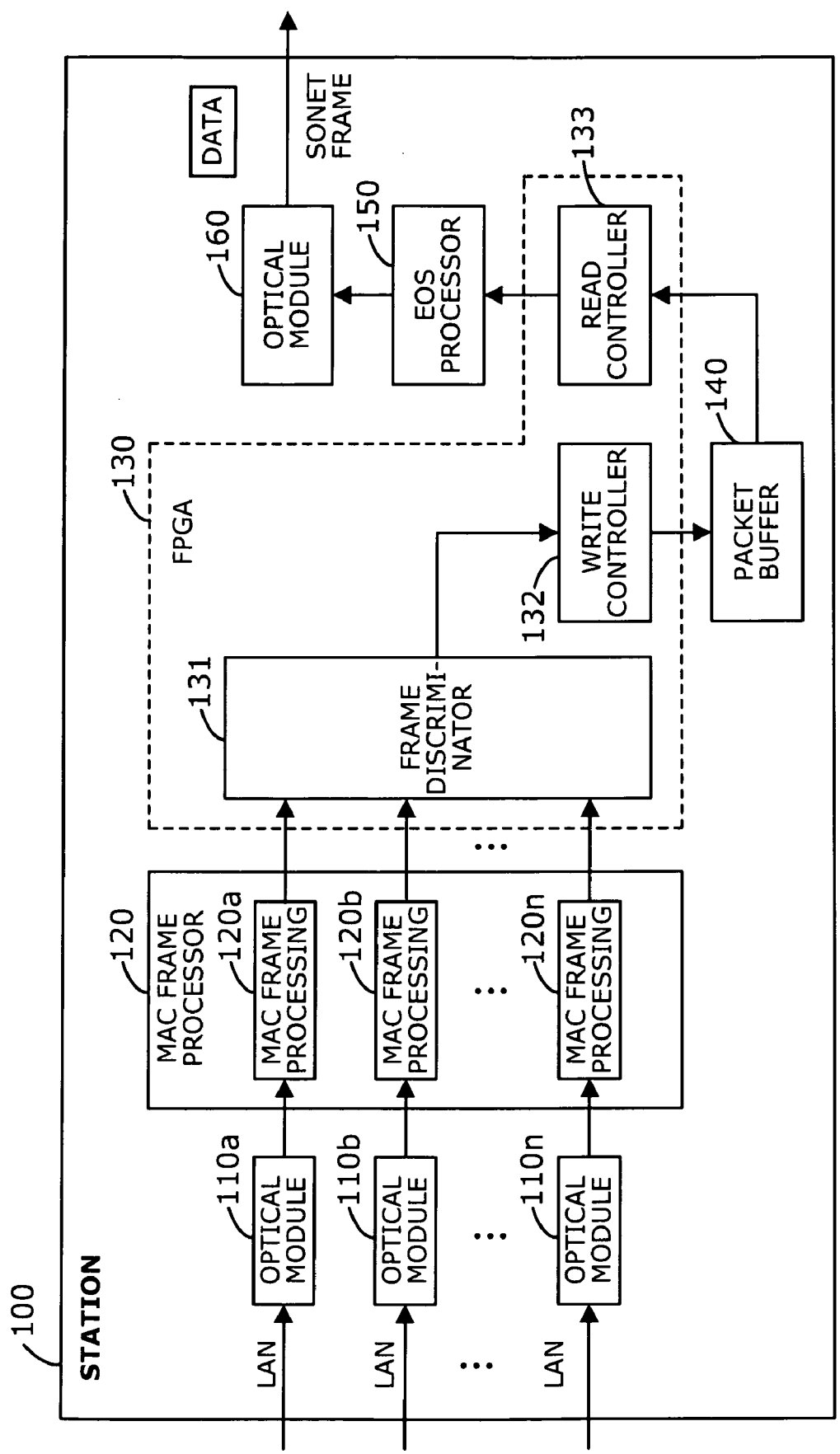
FIG. 3 illustrates a hardware configuration of a station.

FIG. 3 illustrates a hardware configuration of a station. The illustrated station 100 is formed from, among others, the following elements: a plurality of optical modules 110a to 110n, a MAC frame processor 120, a field-programmable gate array (FPGA) 130, a packet buffer 140, an Ethernet™ over SONET (EOS) processor 150, and an optical module 160. The FPGA 130 is used to implement functions of a frame discriminator 131, a write controller 132, and a read controller 133.

The role of the illustrated station 100 is to forward data from the multiplexer 210a (see FIG. 2) to another station. Specifically, the station 100 receives from the multiplexer 210a a plurality of media access control (MAC) frames, which are compatible to local area networks (LAN). Those MAC frames are entered to optical modules 110a, 110b, ... 110n, where their respective optical signals are converted to electrical form. The resulting electrical frame signals undergo MAC frame processing 120a, 120b, ... 120n in the MAC frame processor 120. The processed signals are then directed to the frame discriminator 131 in the FPGA 130.

Figure 4:
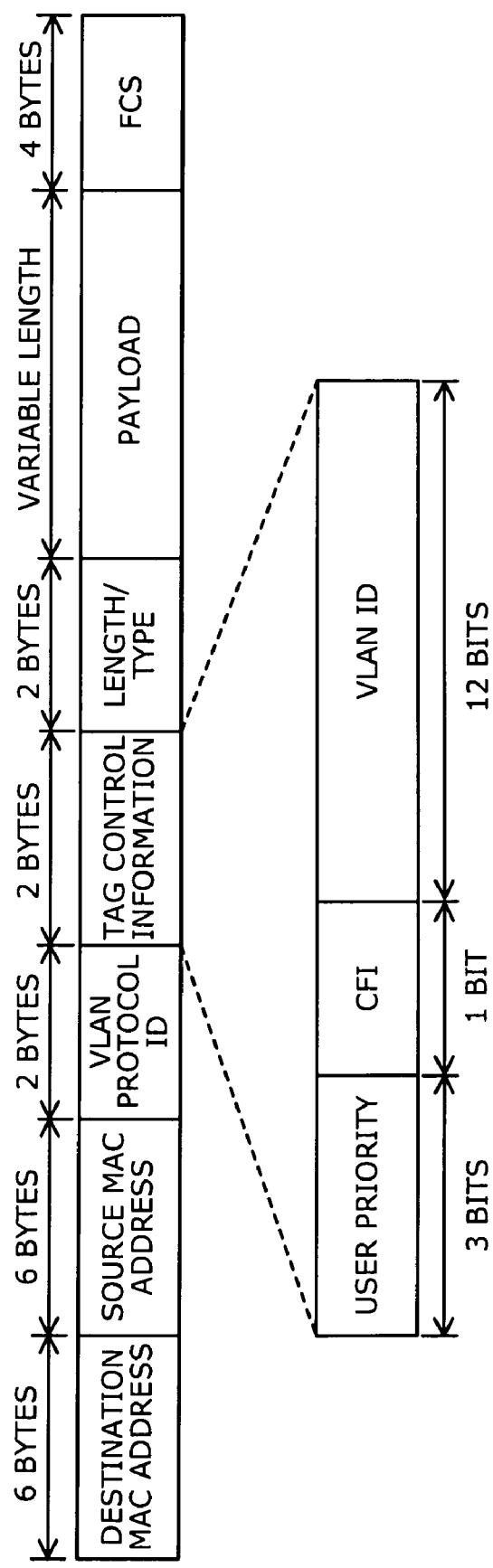
FIG. 4 illustrates an example data structure of Ethernet packets.

The frame discriminator 131 discriminates received frames (packets) from each other and identifies the physical port number and other parameters of each frame from its destination field (FIG. 4). The frame discriminator 131 supplies the received frames, together with the above-noted information, to the write controller 132. The write controller 132 controls write operation of received data to the packet buffer 140 according to the outcomes of the frame discriminator 131.

The read controller 133 reads data out of the packet buffer 140. The read controller 133 passes all or part of those read data to the EOS processor 150 while discarding some data if necessary. The EOS processor 150 maps Ethernet frames (MAC frames) on SONET frames before supplying them to the optical module 160. The optical module 160 converts an electrical signal to an optical signal to send out packet data to a peer station.

Some stations (e.g., station 100c in FIG. 2) receive frame data from other station and forward it to a demultiplexing device (e.g., demultiplexer 220*a* in FIG. 2). Such an egress station process data flowing in the opposite direction to that illustrated in FIG. 3. Specifically, the egress station receives SONET frames and convert them into MAC frames for delivery over a local area network. The present description, however, does not provide details of this processing.

Some other stations (e.g., station 100*b* in FIG. 2) forward SONET frames from one station to another. Such an intermediary station is capable of dropping some data addressed to particular destinations and reassembles the remaining data back into SONET frames before forwarding them to the next station. The present description also omits details of this processing.

To support bidirectional communication between terminals, as well as data transport between stations, the station 100 has the functions of egress and intermediate stations mentioned above, in addition to those depicted in FIG. 3. This is also true for all stations 100*a*, 100*b*, 100*c*, 100*d*, and 100*e* in the system of FIG. 2.

While FIG. 3 gives an example of SONET-based network communication, the station 100 may also be designed for LAN-to-LAN communication. In this case, the station 100 receives and transmits Ethernet packets, rather than SONET frames. The present description, however, does not discuss details of this alternative configuration.

FIG. 4 illustrates an example data structure of Ethernet packets, which may be used in LAN segments in the communications system of FIG. 2. The terminals 300*a* to 300*f* (FIG. 2) exchange such Ethernet packets. The illustrated Ethernet packet is formed from the following data fields: destination MAC address (MAC DA), source MAC address (MAC SA), virtual LAN protocol Identifier (VLAN ID), tag control information, length/type, payload, and frame check sequence (FCS).

Destination MAC address field contains a unique address used to identify a communication interface of the destination terminal. Source MAC address field contains a unique address used to identify a communication interface of the source terminal. VLAN protocol ID contains a value indicating, for example, that the packet is a VLAN packet. Tag control information field carries user priority, CFI, and VLAN ID. Length/type field indicates the length of the packet, as well as specifying which protocol is used for packet communication. Payload field carries the substantial part of transmit data (e.g., fixed-length segments of an IP packet). FCS field contains a code for checking error of a received packet.

As mentioned, the tag control information field is formed from user priority, CFI, and VLAN ID fields. User priority field is 3 bits in length, which indicates a priority assigned to the packet. For example, this user priority field may contain the following values to specify priority classes: 0/1 (class A), 2/3 (class B), 4/5 (class C), and 6/7 (class D). CFI, or "canonical form indicator," is used in writing a DiffServ code point (DSCP). Specifically, CFI field contains a value of zero for little endian or one for big endian. VLAN ID field contains a VLAN identifier. The VLAN mechanism enables a single physical network to be divided into a plurality of logical networks (VLANs), each of which is identified by a unique VLAN ID. Specifically, VLAN ID is used to recognize a particular user when routing packets to their destinations.

Note that the present embodiment is not limited to use with MPLS frames or VLAN frames. Rather, the present embodiment may be arranged to determine the priority class of a packet or frame assembled in other format by referring to a relevant bit or bits defined in that format. There are, in fact, a variety of packet data structures, depending on, for example, the configuration of network.

Figure 5:
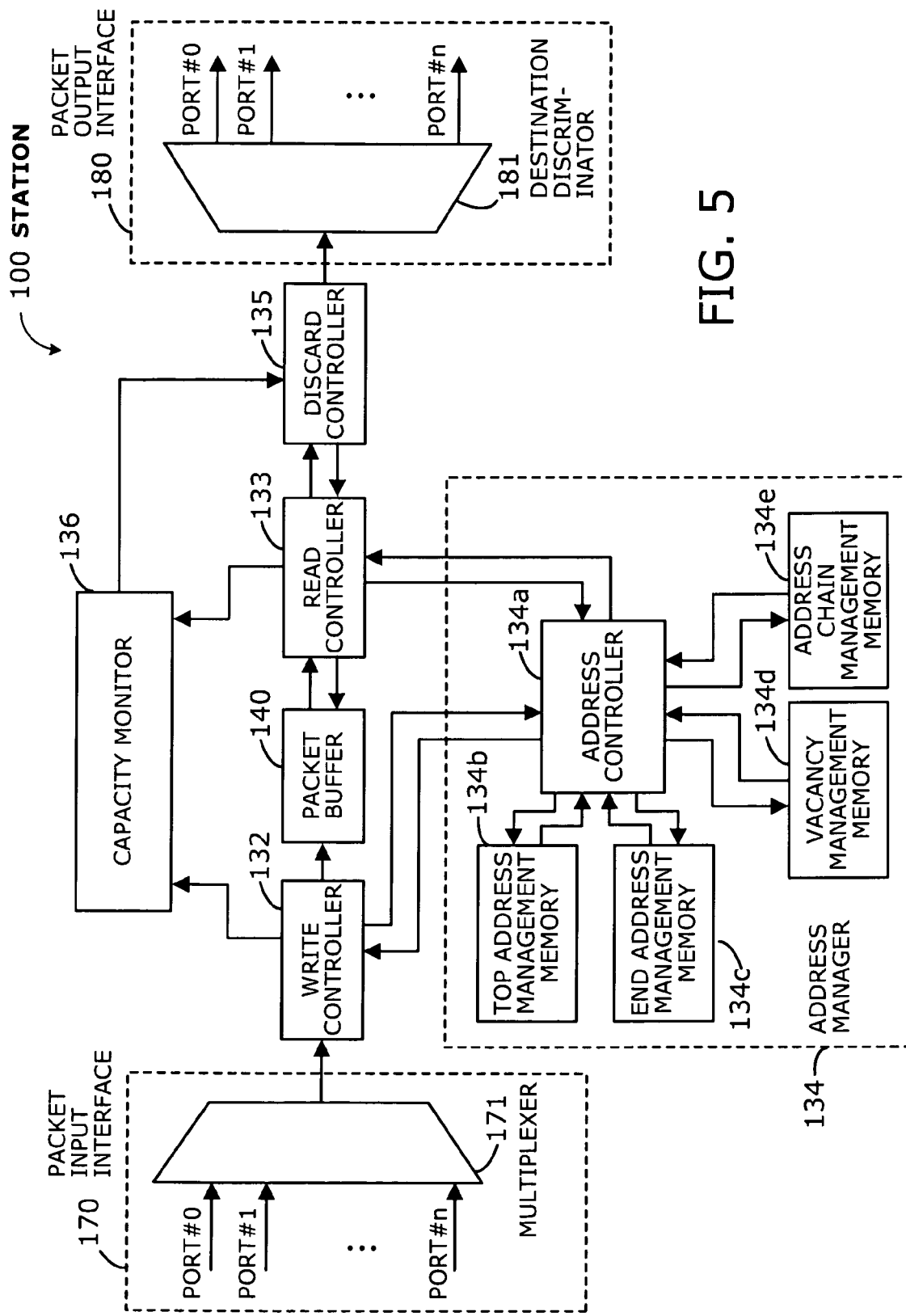
FIG. 5 is a block diagram illustrating functions provided by a station according to a first embodiment.

FIG. 5 is a block diagram illustrating functions provided by a station according to the first embodiment. While FIG. 5 illustrates functional modules included in the station 100, other stations 100*a* to 100*e* (FIG. 2) may have a similar modular structure.

The station 100 includes a packet buffer 140 for use as temporary storage of transmit data. According to the present embodiment, the station 100 has a write controller 132, a read controller 133, an address manager 134, a discard controller 135, a capacity monitor 136, a packet input interface 170, and a packet output interface 180. Those elements are employed to prevent overflow of the packet buffer 140.

The address manager 134 includes an address controller 134*a*, a top address management memory 134*b*, an end address management memory 134*c*, a vacancy management memory 134*d*, and an address chain management memory 134*e*. The packet input interface 170 includes a multiplexer 171. The packet output interface 180 includes a destination discriminator 181.

The write controller 132 performs write operations to the packet buffer 140 to store data that the station 100 has received. Upon receipt of a packet, the write controller 132 informs the address controller 134*a* of the received packet. This receive packet information includes destination physical port ID, packet size, and the like. In response, the address controller 134*a* provides a write address indicating a free space in the packet buffer 140, thus permitting the write controller 132 to write the received data in that space.

The read controller 133 reads packet data out of the packet buffer 140 when transmitting or discarding packets. The address controller 134*a* provides the read controller 133 with a read address for this read operation.

With the above-described mechanism, the data received by the station 100 stays temporarily in the packet buffer 140 before it is transmitted out of the station 100. The transmitted data will be delivered to its destination terminal by the communication system (FIG. 2) to which the station 100 belongs.

The address controller 134*a* controls the top address management memory 134*b*, end address management memory 134*c*, vacancy management memory 134*d*, and address chain management memory 134*e*, so as to manage write and read addresses indicating which memory areas to write or read, as well as providing such address information to other functional blocks of the station 100.

The top address management memory 134*b* stores address values indicating a storage location of the top packet of each series of packets classified by their destination physical ports and priorities. Detailed description will be provided later with reference to FIG. 12.

The end address management memory 134*c* stores address values indicating a storage location of the last packet of each series of packets classified by their destination physical ports and priorities. Detailed description will be provided later with reference to FIG. 13.

The vacancy management memory 134*d* stores address values indicating which storage areas are vacant (or available for use). Detailed description will be provided later with reference to FIG. 10.

The address chain management memory 134*e* stores a chain of addresses of packet data stored in the packet buffer 140. This address chain indicates which packets (and their data) are linked in what order. The address chain management memory 134*e* manages such address chains for each destination and priority class. Detailed description will be provided later with reference to FIG. 11.

The discard controller 135 receives capacity information from the capacity monitor 136. Based on this capacity information, the discard controller 135 monitors the amount of data stored in the packet buffer 140 for each port and priority class. If the amount of stored data exceeds a predetermined threshold, the discard controller 135 discards data read out of the packet buffer 140, thereby increasing free space in the packet buffer 140.

The discard operation does not allow some specified packet data in the packet buffer 140 to reach a physical port of the packet output interface 180. The read controller 133 reads out such packet data from the packet buffer 140, but that data is discarded by the discard controller 135, without being transmitted from a physical port of the packet output interface 180.

As mentioned earlier, every packet has been assigned a specific priority class and a specific output port. In the case where the packet buffer 140 lacks sufficient free space, and if all pieces of data stored in the packet buffer 140 have the same priority, the discard controller 135 discards the entire data in the packet buffer 140. More specifically, the discard controller 135 examines the amount of stored data classified by priority class and output port, thus determining whether the observed amount exceeds a predetermined threshold. If the threshold is exceeded with respect to a specific combination of priority class and output port, the discard controller 135 begins discarding the data corresponding to that combination.

The discard controller 135 may use two different thresholds for discard operations. One is a start threshold at which the discard controller 135 starts discarding data, and the other is a stop threshold at which the discard controller 135 stops discarding data. The stop threshold is smaller than the start threshold. Discard operation nullifies packet data in the order they have arrived. In other words, the earliest data will be discarded first.

The capacity monitor 136 watches the packet buffer 140 to observe the amount of stored data on the basis of combinations of priority class and output port. The capacity monitor 136 provides the discard controller 135 with the observed values as capacity information. The discard controller 135 initiates discard operations based on this capacity information.

The packet buffer 140 is a memory for storing data of received packets. More specifically, the packet buffer 140 serves as a temporary memory for the data that the station 100 has received. Received data is written in the packet buffer 140 under the control of the write controller 132 and maintained therein until it is read out by the read controller 133. This packet buffer 140 is implemented by using SRAM memories or like devices with sufficiently fast access time with respect to packet transmission rates.

The packet input interface 170 has a multiplexer 171 to collect incoming packets from multiple physical ports (port #0 to port #n) and multiplex them into a single stream. This multiplexed packet stream is then passed to the write controller 132.

The packet output interface 180 has a destination discriminator 181 to discriminate individual output packets read out of the packet buffer 140. The destination discriminator 181 distributes each packet to one of the (n+1) physical ports (port #0 to port #n) corresponding to its destination.

In operation of the station 100 according to the present embodiment, the packet input interface 170 receives multiple incoming packets, and the write controller 132 writes them into the packet buffer 140. The capacity monitor 136 constantly watches read and write operations to the packet buffer 140, thus monitoring, for example, the amount of data stored therein, with respect to each output port and each priority class. If the amount of data corresponding to a specific output port and priority class exceeds a start threshold, the discard controller 135 begins discard operations in the following way.

First, the discard controller 135 commands the read controller 133 to read specified data out of the packet buffer 140 for discard operation. The read controller 133 then requests the address controller 134a to provide address information indicating where in the packet buffer 140 the specified data is stored. The read controller 133 makes this request in the same way as it usually does for output packets. Upon receipt of address information, the read controller 133 supplies the address to the packet buffer 140, thus initiating a read operation for the specified data. Upon receipt of the requested data from the packet buffer 140, the read controller 133 directs the received data to the discard controller 135. The discard controller 135 discards this data internally, without sending it to the subsequent packet output interface 180.

Figure 6:
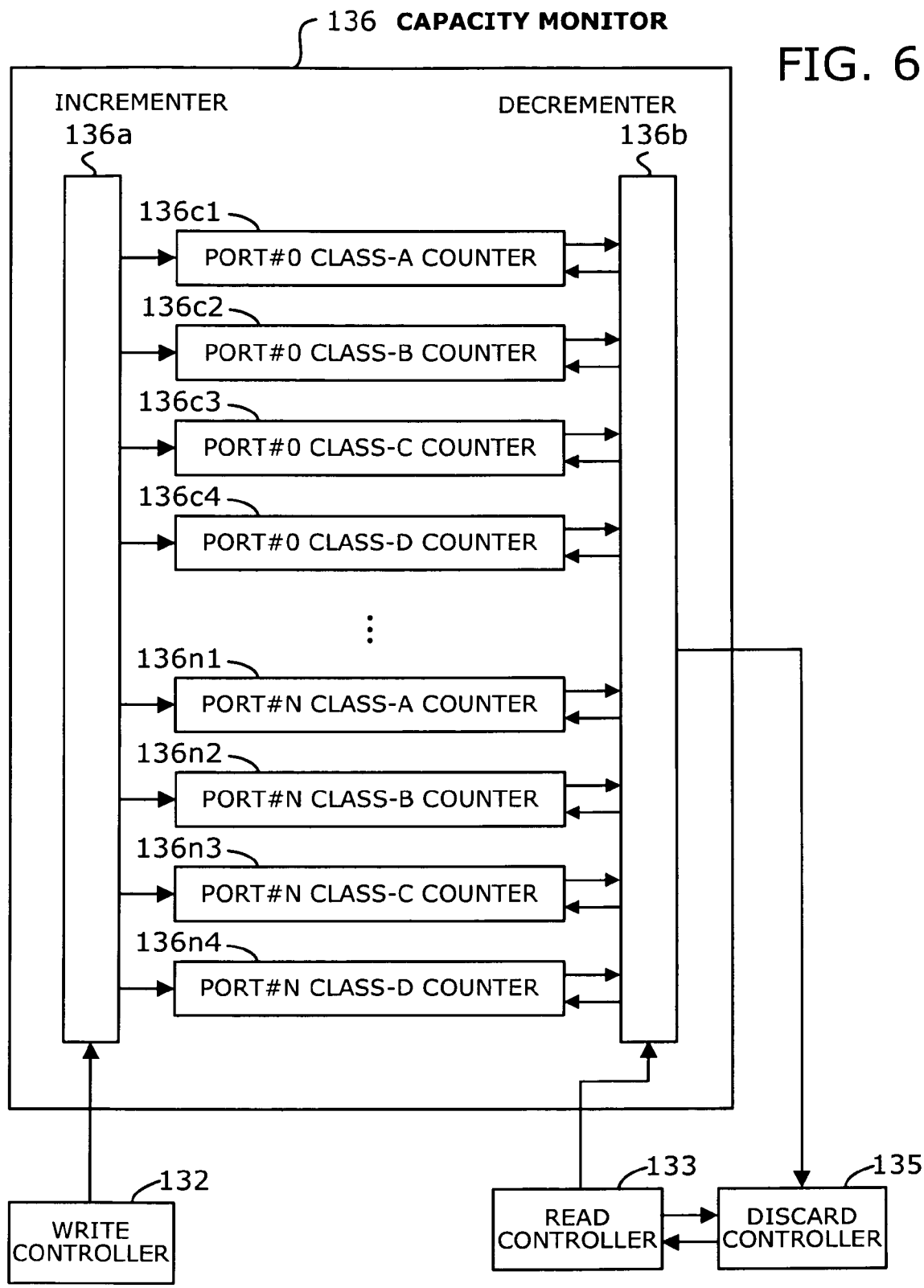
FIG. 6 is a functional block diagram of a capacity monitor.

FIG. 6 is a functional block diagram of a capacity monitor. The illustrated capacity monitor 136 has, among others, an incrementer 136a and a decrementer 136b. The capacity monitor 136 also includes a plurality of counters to manage the amount of stored data in the packet buffer 140 (FIG. 3).

As FIG. 6 indicates, each counter in the capacity monitor 136 corresponds to a specific combination of a physical port of the packet output interface 180 (FIG. 5) and a priority class. Specifically, the capacity monitor 136 has a port#0 class-A counter 136c1 to count the amount of stored data for class-A packets to be transmitted from port #0 of the packet output interface 180. As explained earlier, class A refers to the highest priority level. Similarly, the capacity monitor 136 has a port#0 class-B counter 136c2, port#0 class-C counter 136c3, port#0 class-D counter 136c4, . . . port#n class-A counter 136n1, port#n class-B counter 136n2, port#n class-C counter 136n3, and port#n class-D counter 136n4.

The incrementer 136a watches the write controller 132 writing packet data in the packet buffer 140 and increments a counter corresponding to the physical output port and priority class of that packet. The decrementer 136b, on the other hand, watches the read controller 133 reading packet data from the packet buffer 140 and decrements a counter corresponding to the physical output port and priority class of that packet. The decrementer 136b may receive a request for capacity information from the discard controller 135. This request specifies a particular physical port and a particular priority class. In response, the decrementer 136b provides the requested information to the discard controller 135 by consulting the counter corresponding to the specified physical port and priority class.

Figure 7:
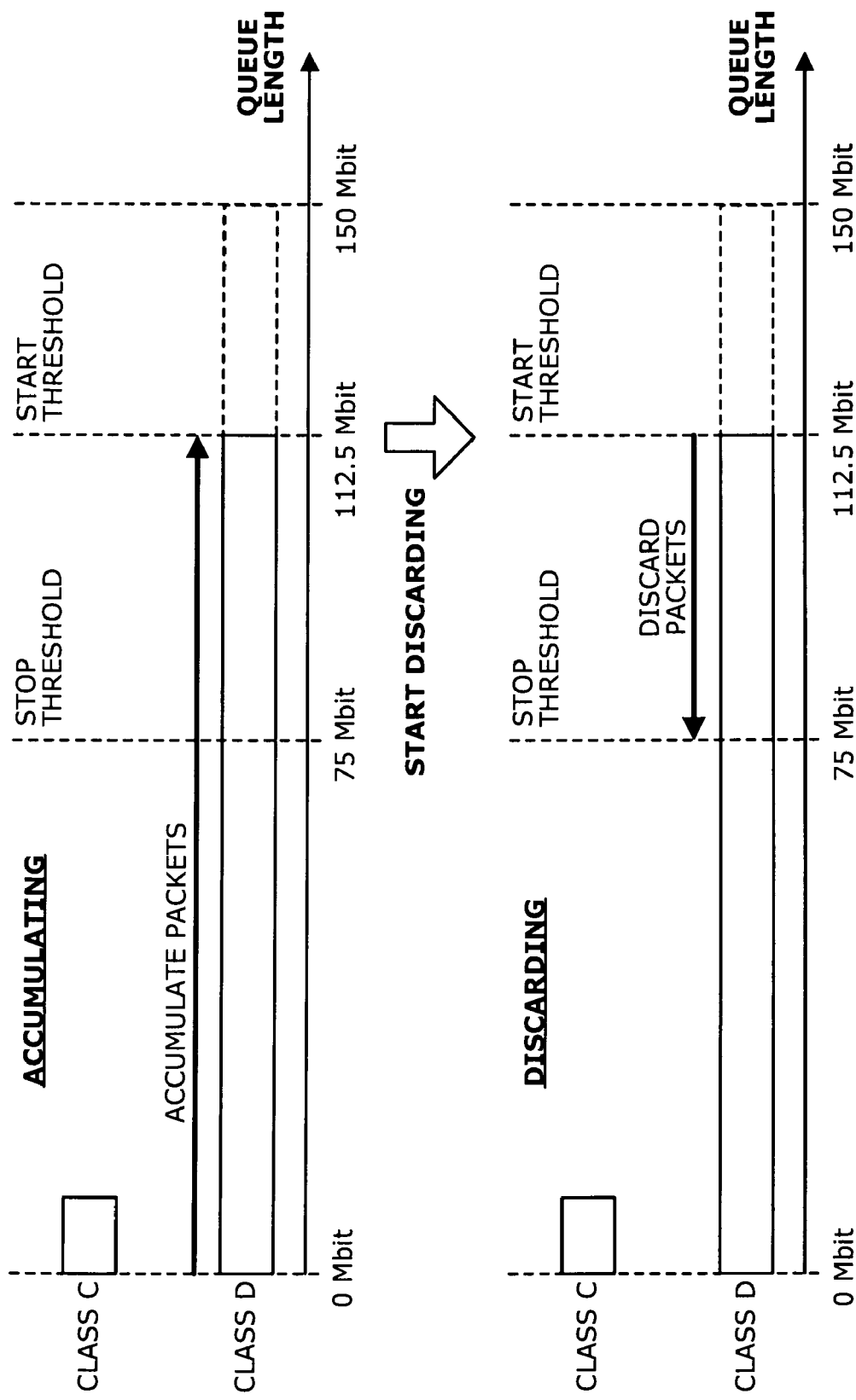
FIG. 7 illustrates queue lengths in a packet buffer when packets are discarded according to the first embodiment.

FIG. 7 illustrates queue lengths in a packet buffer when packets are discarded according to the first embodiment. When the amount of data stored in the packet buffer 140 (FIG. 3) exceeds a start threshold of discard operation, the station 100 begins reading and discarding data in the packet buffer 140, thus creating a free space. As the discard operations proceed, the amount of stored data decreases accordingly. When it falls below a stop threshold (smaller than the start threshold), the station 100 stops the discard operation.

According to the first embodiment, the queue lengths in the packet buffer 140 vary in the way illustrated in FIG. 7. Suppose, for example, that incoming packets of a particular priority class (e.g., class D) outpaces output packets of the same priority class. In this case, the incoming packets accumulates in a class-D storage area of the packet buffer 140. The upper half of FIG. 7 depicts this situation, in which the queue length of class-D data increases toward a predetermined start threshold (e.g., 112.5 Mbit.)

The station 100 then performs discard operations to reduce the queue length in the way illustrated in the lower half of FIG. 7. That is, in the case where the above-described data accumulation continues up to the start threshold, the station 100 begins to remove excessive packets from the class-D storage area. This discard operation is repeated until the amount of data stored in that storage area hits the stop threshold (e.g., 75 Mbit). Note that only the class-D packets are discarded. When the class-D packets decreases to the stop threshold, the station 100 stops discard operations.

The above-described discard operations remove data from the packet buffer 140, thus increasing its free space up to a certain amount. The free space created in the packet buffer 140 prevents overflow (and consequent loss) of incoming packets. The packet buffer 140 can therefore accept new incoming packets.

The monitoring and discarding of stored data is performed on an individual priority class basis. By discarding excessive packet data of a certain priority class, the station 100 prevents its packet buffer 140 from being occupied by the packets of that class. This means that the packet buffer 140 can accommodate incoming packets belonging to a higher priority class, thus making it possible to maintain its guaranteed CIR.

The start threshold and stop threshold mentioned above may be determined from, for example, the number of priority classes, and the input and output ratios of packet data of each priority class.

The first embodiment allows write operations for newly received packets to take place simultaneously with discard operations. The present embodiment is not limited to this specific control. Rather, the present embodiment may be modified to inhibit the packet buffer 140 from accepting input packets during discard operations.

Operation Under First Condition

This section describes how the proposed station 100 handles incoming packets, with reference to a more specific example. The station 100 may receive a continuous series of incoming packets with a particular priority class (e.g., class D) that exceeds a start threshold. The present description refers to this situation as a "first condition." The first condition assumes that the station 100 has not received any packets before. In other words, the packet buffer 140 is empty.

Figure 8:
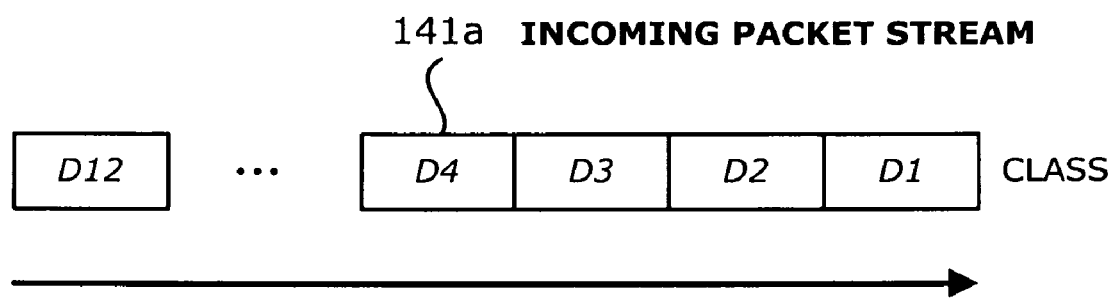
FIG. 8 illustrates incoming packets received under a first condition.

The station 100 operates under this first condition in the way depicted in FIGS. 8 to 18. Briefly, FIG. 8 illustrates an incoming packet stream of the first condition, and FIGS. 9 to 13 illustrate internal state of the station 100 at the moment when all those packets of FIG. 8 have written in the packet buffer 140 (FIG. 3). FIGS. 14 to 18 then illustrate another internal state of the station 100 at the moment when it has executed discard operations for those packets.

FIG. 8 illustrates an incoming packet stream 141a that the station 100 receives under the first condition. The incoming packet stream 141a includes twelve packets, D1 to D12, all of which are class-D packets. Those packets D1 to D12 arrive at the station 100 sequentially in that order.

Figure 9:
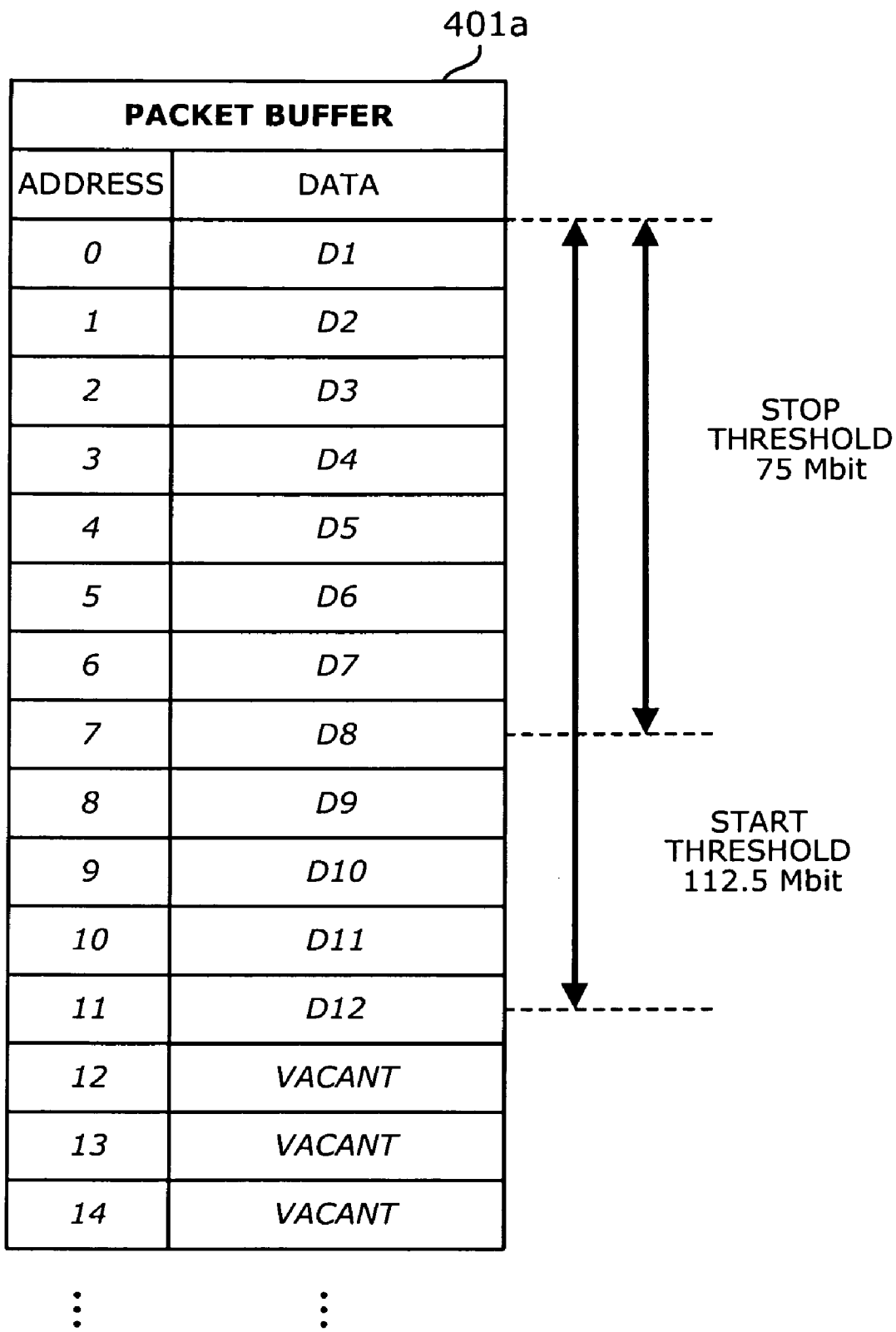
FIG. 9 illustrates the packet buffer at the moment when the received packets of the first condition have just been written.

FIG. 9 illustrates the packet buffer 140 (FIG. 3) at the moment when the received incoming packet stream 141a (FIG. 8) of the first condition has just been written. Specifically, the illustrated memory content 401a of the packet buffer 140 is formed from "ADDRESS" and "DATA" fields. The address field represents address of the packet buffer 140, assuming that the storage space of the packet buffer 140 is divided into 10-Mbit segments, one for each address. The data field indicates whether a packet is stored in the corresponding address. For simplicity, every packet is assumed to have a size of 10 Mbit. It is also assumed that the station 100 has a stop threshold of 75 Mbit and a start threshold of 112.5 Mbit.

Received packets are stored sequentially in the packet buffer 140 as they arrive at the station 100. The remaining storage areas are free space available for other packet data.

In the present example of the first condition, the station 100 receives twelve packets D1 to D12 (141a in FIG. 8) and sends them to the packet buffer 140 in the order of their arrival. Since the packet buffer 140 has been empty, the received packets D1 to D12 are neatly aligned in the space from address 0 to address 11, as can be seen from the memory content 401a of FIG. 9. Address 12 and subsequent areas are free space available for other packet data.

FIG. 10 illustrates the vacancy management memory 134d (FIG. 5) at the moment when the received packets of the first condition have just been written in the packet buffer 140. Specifically, the illustrated memory content 401b of the vacancy management memory 134d is formed from "ADDRESS" and "DATA" fields. The address field represents address of the vacancy management memory 134d, which corresponds to that of the packet buffer 140 (FIG. 3). Each address represents a 10-Mbit segment of the packet buffer 140, as mentioned above in FIG. 9. The data field, on the other hand, indicates whether the corresponding segment of storage space is vacant (available) or occupied (unavailable). As mentioned, the present example assumes that each packet is 10 Mbit in length.

Each time the station 100 enters a received packet in its packet buffer 140, it also changes the corresponding data field of the vacancy management memory 134d to "UNAVAILABLE." The remaining entries have a value of "AVAILABLE" in their data field since their corresponding buffer segments are vacant. FIG. 10 illustrates the resulting memory content 401b of the vacancy management memory 134d.

In the present example of the first condition, the station 100 receives twelve packets D1 to D12 (141a in FIG. 8). Since the packet buffer 140 has been empty, the received packets D1 to D12 are aligned in the space from address 0 to address 11. Accordingly, the corresponding addresses 0 to 11 of the vacancy management memory 134d are set to the "UNAVAILABLE" state, as can be seen from the memory content 401b of FIG. 10, whereas address 12 and subsequent addresses are set to "AVAILABLE" since their corresponding buffer segments are still empty.

FIG. 11 illustrates the address chain management memory 134e (FIG. 5) at the moment when the received packets of the first condition have just been written in the packet buffer 140. Specifically, the illustrated memory content 401c of the address chain management memory 134e is formed from "ADDRESS" and "DATA" fields. The address field represents address of the address chain management memory 134e, which corresponds to that of the packet buffer 140 (FIG. 3). Each address represents a 10-Mbit segment of the packet buffer 140, as discussed earlier in FIG. 9. The data field, on the other hand, indicates how the segments of the packet buffer 140 are linked to each other to store a series of received packets. The present example assumes that each packet is 10 Mbit in length.

Each time the station 100 enters a new packet in its packet buffer 140, it also changes the address chain management memory 134e such that the entry corresponding to the previous packet will contain a "NEXT ADDRESS" value indicating the address of the newly entered packet. The data field corresponding to the last received packet contains a value of "NEXT ADDRESS=NONE." The remaining entries have a value of "VACANT" in their data field since their corresponding buffer segments are vacant. FIG. 11 illustrates the resulting memory content 401c of the address chain management memory 134e.

In the present example of the first condition, the station 100 receives twelve packets D1 to D12 (141a in FIG. 8). Since the packet buffer 140 has been empty, the received packets D1 to D12 are aligned in the space from address 0 to address 11. Accordingly, in the address chain management memory 134e, the data fields of addresses 0 to 10 are set as follows: "NEXT ADDRESS=1," "NEXT ADDRESS=2," "NEXT ADDRESS=3," . . . "NEXT ADDRESS=11." That is, each data field indicates where the next packet data is stored, as can be seen from the memory content 401c of FIG. 11. Address 11 of the packet buffer 140 stores the last received packet. Accordingly, the corresponding data field of the address chain management memory 134e is set to "NEXT ADDRESS=NONE," whereas the remaining entries are set to "VACANT" since their corresponding buffer segments are still empty.

FIG. 12 illustrates the top address management memory 134b (FIG. 5) at the moment when the received packets of the first condition have just been written in the packet buffer 140. Specifically, the illustrated memory content 401d of the top address management memory 134b is formed from "PORT," "CLASS," and "TOP ADDRESS" fields. The port field contains a port number indicating to which physical port of the packet output interface 180 the stored packets will be directed. This output port has been determined in accordance with each packet's destination address. The class field indicates a priority class of received packets. The top address field contains an address value indicating where in the packet buffer 140 (FIG. 3) the topmost packet of a received packet stream is stored.

Each time the station 100 enters a new stream of packets in its packet buffer 140, it also updates the top address management memory 134b such that its entry corresponding to the physical output port and priority class of those packets will contain an address value indicating the storage location of the top packet of the received stream. FIG. 12 illustrates the resulting memory content 401d of the top address management memory 134b.

In the present example of the first condition, the station 100 receives twelve class-D packets D1 to D12 (141a in FIG. 8). Since the packet buffer 140 has been empty, the received packets D1 to D12 are aligned in the space from address 0 to address 11. Since the top packet D1 is stored in address 0 of the packet buffer 140, the top address management memory 134b contains a value of "TOP ADDRESS=0" in its entry corresponding to the combination of port #0 and priority class D, assuming that those packets are to be directed to port #0 for delivery to their destination. The other entries remain unchanged, with an initial value in their respective top address fields, since there are no received packets for them.

FIG. 13 illustrates the end address management memory 134c (FIG. 5) at the moment when the received packets of the first condition have just been written in the packet buffer 140. Specifically, the illustrated memory content 401e of the end address management memory 134c is formed from "PORT," "CLASS," and "END ADDRESS" fields. The port field contains a port number indicating to which physical port of the packet output interface 180 the stored packets will be directed. This output port has been determined in accordance with each packet's destination address. The class field indicates a priority class of received packets. The end address field contains an address value indicating where in the packet buffer 140 (FIG. 3) the last packet of a received packet stream is stored.

Each time the station 100 enters a packet in its packet buffer 140, it also updates the end address management memory 134c such that its entry corresponding to the physical output port and priority class of this last received packet will contain an address value indicating the storage location of that packet in the packet buffer 140. FIG. 13 illustrates the resulting memory content 401e of the end address management memory 134c.

In the present example of the first condition, the station 100 receives twelve class-D packets D1 to D12 (141a in FIG. 8). Since the packet buffer 140 has been empty, the received packets D1 to D12 are aligned in the space from address 0 to address 11. Those class-D packets are to be directed to port #0 for delivery to their destination. Since the last packet D12 is stored in address 11 of the packet buffer 140, the end address management memory 134c contains a value of "END ADDRESS=11" in the entry corresponding to the combination of port #0 and priority class D. The other entries remain unchanged, with an initial value in their respective end address fields, since there are no received packets for them.

Figure 14:
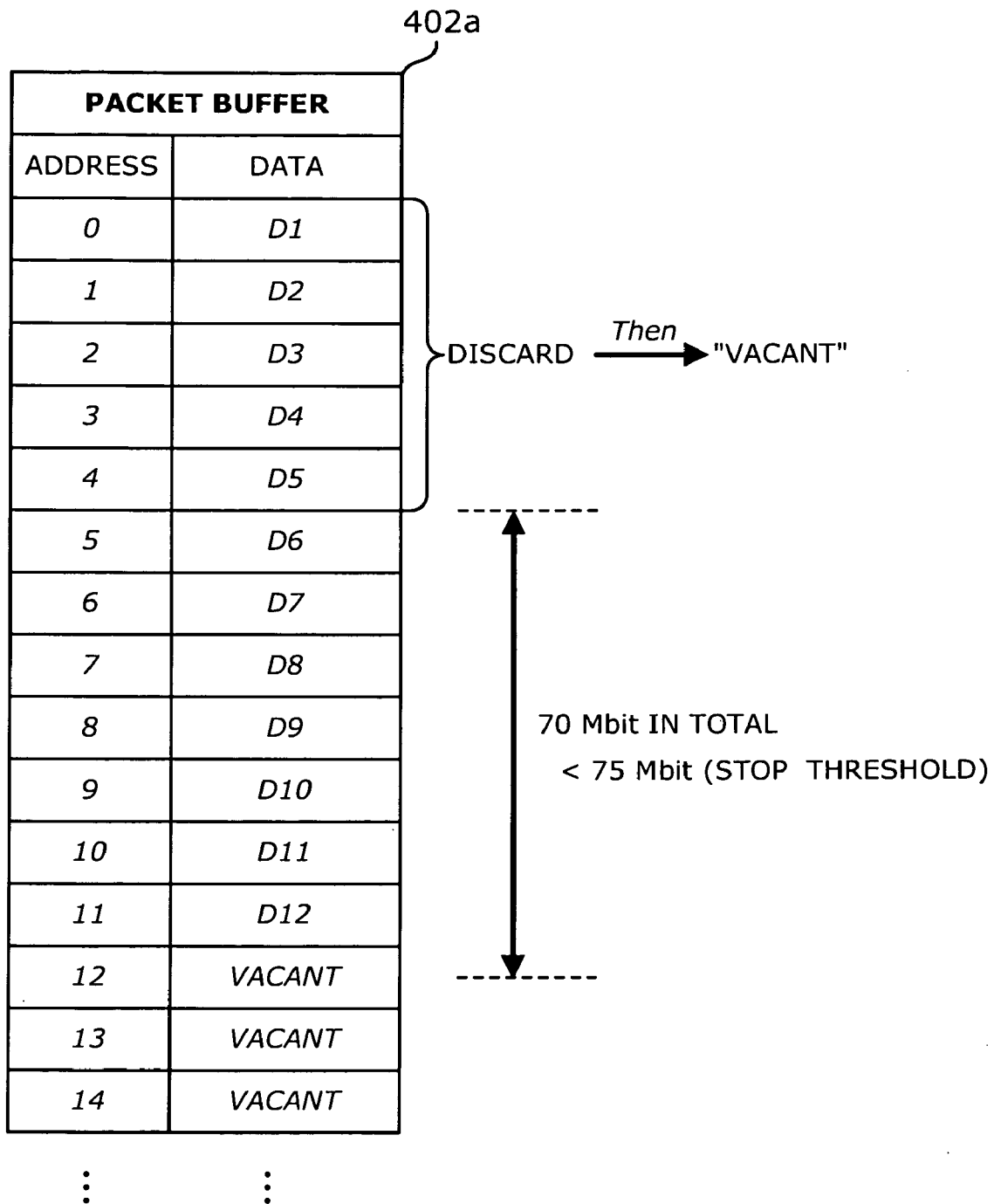
FIG. 14 illustrates the packet buffer at the moment when some packets of the first condition have just been discarded.

FIG. 14 illustrates the packet buffer 140 (FIG. 3) at the moment when some packets of the first condition have just been discarded. Specifically, the illustrated memory content 402a is formed from "ADDRESS" and "DATA" fields, indicating addresses of the packet buffer 140 and their respective stored packets right after the completion of discard operation.

Discard operation is initiated when the amount of stored data in the packet buffer 140 exceeds a start threshold, which nullifies packet data in each storage area in the order of entry. Those emptied storage areas are marked "VACANT" and made available as free space, together with the existing vacant areas.

In the present example of the first condition, the packet buffer 140 has accumulated twelve packets D1 to D12 in address 0 to address 11, as a result of reception of an incoming packet stream 141a (FIG. 8). Now that the last packet D12 hits the start threshold, the oldest data in address 0 is discarded. This discard operation is repeated for the data stored in address 1 to address 4 until the amount of remaining data reaches or falls below the stop threshold. As a result, the emptied addresses 0 to 4 become available again as free space.

FIG. 15 illustrates the vacancy management memory 134d (FIG. 5) at the moment when some packets of the first condition have just been discarded. Specifically, the illustrated memory content 402b is formed from "ADDRESS" and "DATA" fields. The address field represents address of the vacancy management memory 134d, which corresponds to that of the packet buffer 140 (FIG. 3) as mentioned earlier in FIG. 10. The data field indicates whether the corresponding segment of the storage area is vacant (available) or occupied (unavailable), right after discard operation.

As described above, the vacancy management memory 134d indicates "UNAVAILABLE" status in its data field corresponding to each occupied address of the packet buffer 140 (see FIG. 10). When an ordinary read operation or discard operation takes place on some address of the storage area, the corresponding data field of the vacancy management memory 134d is changed from "UNAVAILABLE" to "AVAILABLE." FIG. 15 illustrates the resulting memory content 402b of the vacancy management memory 134d.

In the present example of the first condition, the packet buffer 140 has received an incoming packet stream 141a, and the amount of stored data has exceeded the start threshold.

The consequent discard operation reduces the data below the stop threshold. As a result, the data field of the vacancy management memory 134d now gives an "AVAILABLE" status for five addresses 0 to 4 as illustrated in the memory content 402b of FIG. 15.

FIG. 16 illustrates the address chain management memory 134e (FIG. 5) at the moment when some packets of the first condition have just been discarded. Specifically, the illustrated memory content 402c of the address chain management memory 134e is formed from "ADDRESS" and "DATA" fields. The address field represents address of the address chain management memory 134e, which corresponds to that of the packet buffer 140 (FIG. 3) as mentioned earlier in FIG. 11. The data field indicates an updated linkage between segments of the packet buffer 140, reflecting results of discard operation.

As described above, the address chain management memory 134e stores next address information in its data field corresponding to each occupied address of the packet buffer 140 (see FIG. 11). When an ordinary read operation or discard operation takes place on some address of the packet buffer 140, the corresponding data field of the address chain management memory 134e is changed to "VACANT." FIG. 16 illustrates the resulting memory content 402c of the address chain management memory 134e.

In the present example of the first condition, the packet buffer 140 has received an incoming packet stream 141a, causing the amount of stored data to exceed the start threshold. The consequent discard operation nullifies the data in addresses 0 to 4, thus reducing the amount of stored data below the stop threshold. As a result, the address chain management memory 134e now gives a "VACANT" status in respective data fields of the five emptied addresses 0 to 4 as illustrated in the memory content 402c of FIG. 16.

FIG. 17 illustrates the top address management memory 134b (FIG. 5) at the moment when some packets of the first condition have just been discarded. Specifically, the illustrated memory content 402d is formed from "PORT," "CLASS," and "TOP ADDRESS" fields. The port field contains a port number that indicates a specific physical port of the packet output interface 180 corresponding to the destination of a received packet. The class field indicates a priority class of received packets. The top address field contains an address value indicating where in the packet buffer 140 (FIG. 3) the topmost packet of a received packet stream is stored.

As described above, the top address management memory 134b stores a top address value for each combination of physical output port and priority class of packets stored in the packet buffer 140 (see FIG. 12). When an ordinary read operation or discard operation takes place on some address of the packet buffer 140, the corresponding top address field of the top address management memory 134b is updated to indicate the location of a new topmost packet at that point in time. FIG. 17 illustrates the resulting memory content 402d of the top address management memory 134b.

In the present example of the first condition, the packet buffer 140 has received an incoming packet stream 141a, causing the amount of stored data to exceed the start threshold. The consequent discard operation nullifies four class-D packets destined for port #0, such that the amount of stored data be reduced below the stop threshold. As a result, the top address management memory 134b now gives a value of "TOP ADDRESS=5" in the top address field for port #0 and class D, as illustrated in the memory content 402d of FIG. 17.

FIG. 18 illustrates the end address management memory 134c (FIG. 5) at the moment when some packets of the first condition have just been discarded. Specifically, the illustrated memory content 402e is formed from "PORT," "CLASS," and "END ADDRESS" fields. The port field contains a port number that indicates a specific physical port of the packet output interface 180 corresponding to the destination of a received packet. The class field indicates a priority class of received packets. The end address field contains an address value indicating where in the packet buffer 140 (FIG. 3) the last packet of a received packet stream is stored.

As described above, the end address management memory 134c stores an end address value for each combination of physical output port and priority class of packets stored in the packet buffer 140 (see FIG. 13). When an ordinary read operation or discard operation takes place on some address of the packet buffer 140, the corresponding end address field of the end address management memory 134c indicates the location of the last packet at that point in time. FIG. 18 illustrates the resulting memory content 402d of the top address management memory 134b.

In the present example of the first condition, the packet buffer 140 has received an incoming packet stream 141a, causing the amount of stored data to exceed the start threshold. The consequent discard operation nullifies four class-D packets destined for port #0, such that the amount of stored data be reduced below the stop threshold. The end address management memory 134c continues to give a value of "END ADDRESS=11" in the end address field for port #0 and class D, as illustrated in the memory content 402e of FIG. 18. Note that there is no change in its content, compared with what is illustrated in FIG. 13.

To summarize the above description, the station 100 operates as follows in the first condition depicted in FIGS. 8 to 18. The station 100 receives class-D packets D1 to D12 whose destination corresponds to physical output port #0, causing the amount of stored data in the packet buffer 140 to exceed a start threshold of 112.5 Mbit. Accordingly, the station 100 activates its discard controller 135 to discard read data, instead of transmitting them from physical port #0 of the packet output interface 180 (FIG. 5). In the illustrated example, the discard operation is discontinued when the buffer usage falls below a stop threshold of 75 Mbit as a result of reading of packets D1 to D5 out of the packet buffer 140.

The present embodiment discards data in the packet buffer 140 when the stored data exceeds a start threshold. This feature permits the packet buffer 140 to maintain some amount of free space, thus permitting new incoming packets to enter.

Discard Operation Under Second Condition

This section describes how the station 100 operates in another specific situation, or "second condition," following the foregoing first condition. Suppose, for example, that the station 100 has received class-D packets D1 to D12 (e.g., incoming packet stream 141a illustrated in FIG. 8) under the first condition. The station 100 now receives some additional packets with the same priority, and then a packet with a higher priority. They are, for example, three class-D packets D13 to D15 and one class-C packet C1 (see FIG. 19). The present description refers to this situation as a "second condition."

Figure 19:
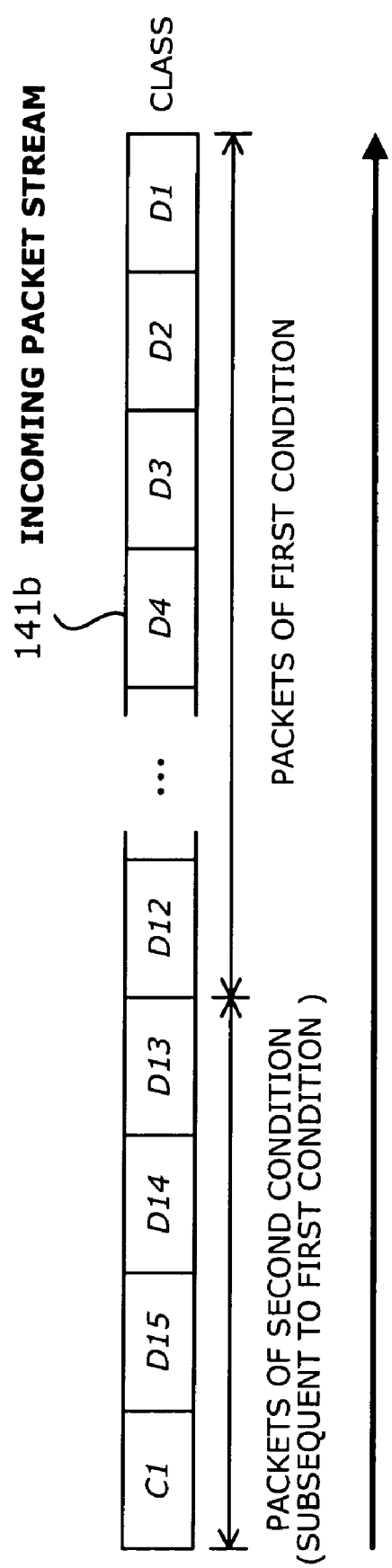
FIG. 19 illustrates an incoming packet stream received under a second condition.

Briefly stated, FIG. 19 illustrates a packet stream that the station 100 receives under the second condition, and FIGS. 20 to 24 illustrate internal state of the station 100 just after the received packets are written in the packet buffer 140 (see FIG. 3). Referring now to these FIGS. 19 to 24, the following will describe how the station 100 handles packets under the second condition. Note that, at the beginning of this operation, the packet buffer 140 already contains several packets that the station 100 received as an incoming packet stream 141a, a part of which were discarded.

FIG. 19 illustrates an incoming packet stream of the second condition, including packets of the first condition. The illustrated incoming packet stream 141b begins with class-D packets D1 to D12 of the first condition. These packets D1 to D12 are immediately followed by another series of packets arriving under the second condition, which include three class-D packets D13 to D15 and a single class-C packet C1 arriving in that order.

Figure 20:
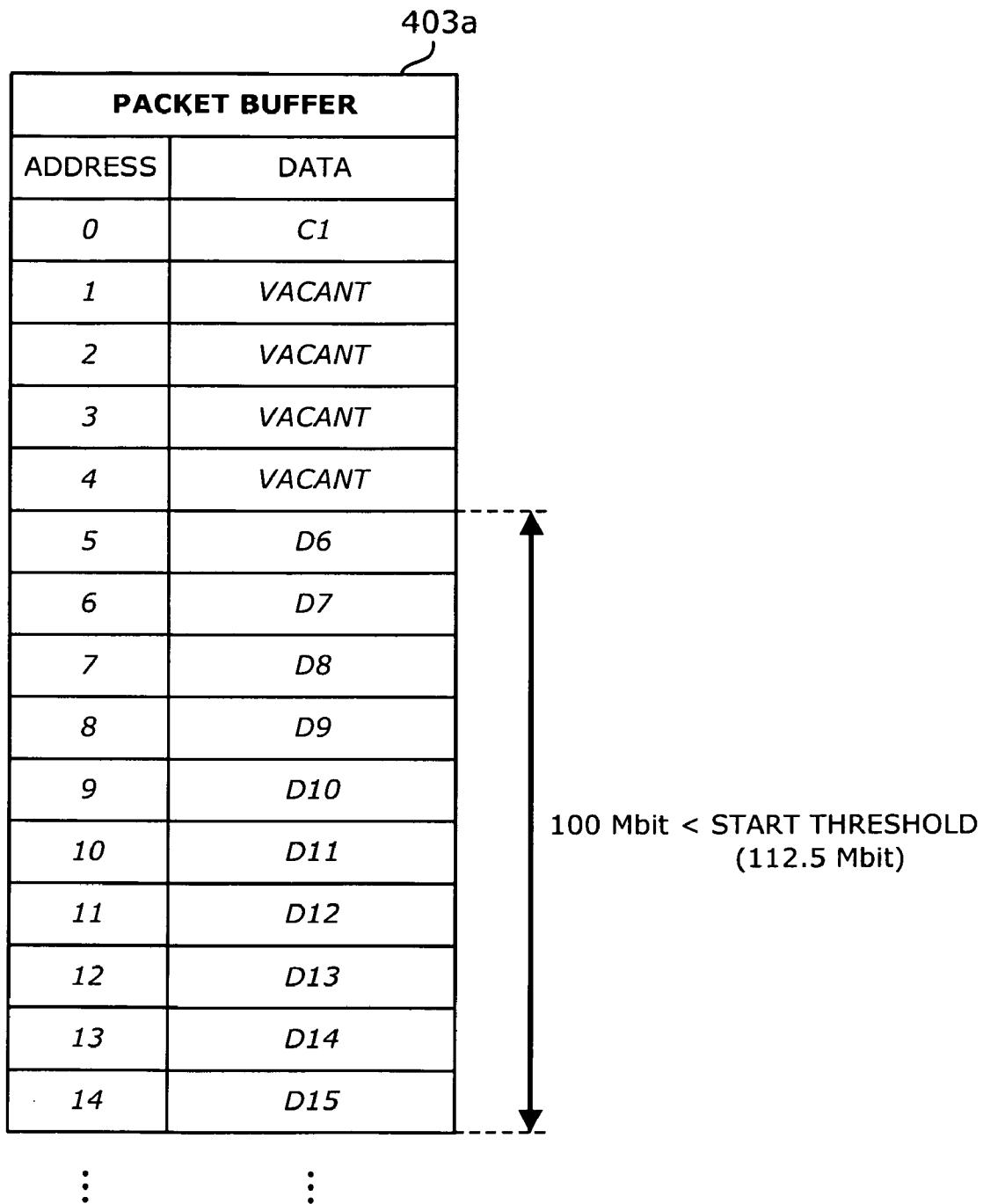
FIG. 20 illustrates the packet buffer at the moment when the received packets of the second condition have just been written.

FIG. 20 illustrates the packet buffer 140 at the moment when the received packets of the second condition have just been written. The station 100 has first received incoming packets D1 to D12 of the first condition and entered them to its packet buffer 140, of which five packets D1 to D5 are discarded (see FIG. 14). The station 100 now receives additional packets D13 to D15 and C1 as part of an incoming packet stream 141b (FIG. 19). The received packets D13 to D15 and C1 fill several vacant segments of the packet buffer 140. More specifically, as illustrated in the memory content 403a of FIG. 20, packet D13 is stored in address 12, next to the immediately preceding packet D12. Subsequent packets D14 and D15 follow this packet D13. Address 0 to address 5 have been vacated as a result of the discard operation for packets D1 to D5. New packet C1 now occupies one of those addresses, address 0, while leaving the other addresses 1 to 4 available as free space.

FIG. 21 illustrates the vacancy management memory 134d at the moment when the received packets of the second condition have just been written in the packet buffer 140. The above-described entry of new packets D13 to D15 and C1 to the packet buffer 140 has caused the vacancy management memory 134d to have new content 403b as illustrated in FIG. 21. Specifically, the data field corresponding to each occupied address 0 and 5-14 is set to "UNAVAILABLE" while the others remain "AVAILABLE."

FIG. 22 illustrates the address chain management memory 134e at the moment when the received packets of the second condition have just been written in the packet buffer 140. The above-described entry of new packets D13 to D15 and C1 to the packet buffer 140 has caused the address chain management memory 134e to have new content 403c as illustrated in FIG. 22. Specifically, the data field corresponding to address 0 of packet C1 now contains a value of "NEXT ADDRESS=NONE." For addresses 5 to 14 storing packets D6 to D15, their respective data fields are set as follows: "NEXT ADDRESS=6," "NEXT ADDRESS=7," "NEXT ADDRESS=8," . . . "NEXT ADDRESS=NONE." The others remain "VACANT" since no data is stored.

FIG. 23 illustrates the top address management memory 134b at the moment when the received packets of the second condition have just been written in the packet buffer 140. The above-described entry of new packets D13 to D15 and C1 to the packet buffer 140 has caused the top address management memory 134b to have new content 403d as illustrated in FIG. 23. Specifically, the top address field corresponding to port #0 and class C contains a value of "TOP ADDRESS=0." The top address field of port #0 and class D, on the other hand, maintains its previous value, "TOP ADDRESS=5."

FIG. 24 illustrates the end address management memory 134c at the moment when the received packets of the second condition have just been written in the packet buffer 140. The above-described entry of new packets D13 to D15 and C1 to the packet buffer 140 has caused the end address management memory 134c to have new content 403e as illustrated in FIG. 24. Specifically, the end address field corresponding to port #0 and class C contains a value of "END ADDRESS=0," while that of port #0 and class D is set to "END ADDRESS=14."

As can be seen from FIGS. 19 to 24, the station 100 accepts class-D packets D13 to D15 and class-C packet C1 of the second condition, subsequent to the class D packet D1 to D12 of the first condition, since the discard operation of packets D1 to D5 created a free space. In other words, the discard operation ensures vacancy in the packet buffer 140, thus permitting late-coming high-priority packets to enter the packet buffer 140 without being lost.

Discard Control Process

First Embodiment

Figure 25:
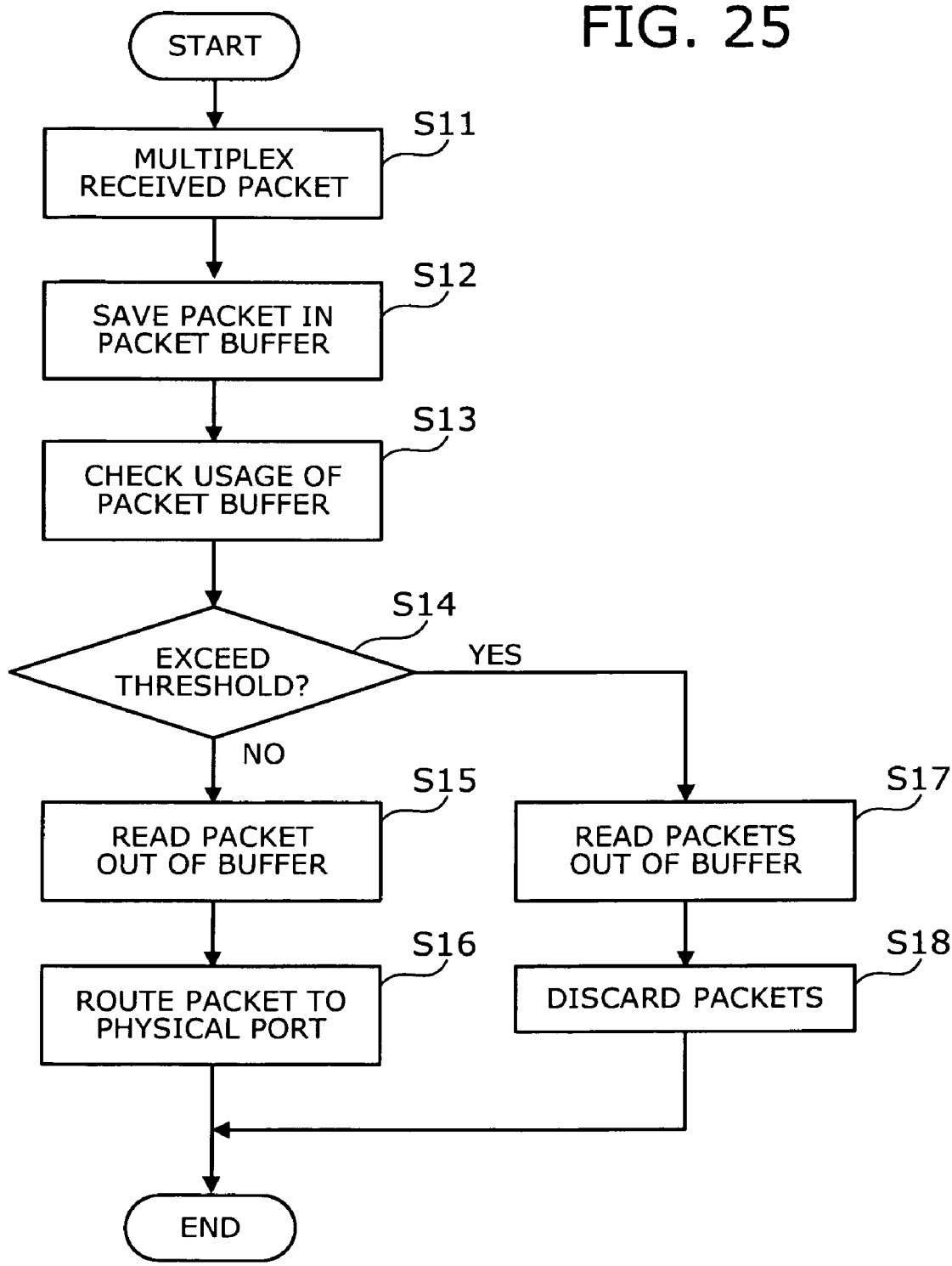
FIG. 25 is a flowchart of a discard control process according to the first embodiment.

FIG. 25 is a flowchart of a discard control process according to the first embodiment. The station 100 of the present embodiment enters incoming packets to a packet buffer 140 as they arrive at physical ports. The packet buffer 140 accumulates those received packets. Each time a new packet arrives, the station 100 invokes a discard control process to check the current state of the packet buffer 140 and determine whether to discard the stored packets. According to the first embodiment, this discard control process includes the following steps:

(Step S11) As each incoming packet arrives at a physical input port (e.g., ports #0 to #n of packet input interface 170 illustrated in FIG. 5), the station 100 multiplexes the received packet with other packets.

(Step S12) The station 100 extracts data from the packet multiplexed at step S11 and saves the extracted data in the packet buffer 140.

(Step S13) The station 100 checks the current usage of the packet buffer 140 to determine how much data is stored. Since the buffer usage is managed class by class (i.e., on an individual priority bases), this step S13 determines buffer usage for each priority class of stored packet data.

(Step S14) The station 100 determines whether the current usage of the packet buffer 140 exceeds a predetermined start threshold. If so, the station 100 advances the process to step S17. If not, the station 100 proceeds to step S15.

(Step S15) The station 100 reads packet data out of the packet buffer 140.

(Step S16) The station 100 routes the packet data read out at step S15 to an appropriate physical port of the packet output interface 180 (FIG. 5) according to its destination, thereby transmitting the packet. The station 100 then exits from this process.

(Step S17) The station 100 reads packet data out of the packet buffer 140. This read operation is repeated until the amount of data stored in the packet buffer 140 falls below a predetermined stop threshold.

(Step S18) The station 100 discards the data read out at step S17 and then exits from this process.

As can be seen from the above, the first embodiment prevents buffer overflow, without significant cost increase. The resulting free space permits the packet buffer 140 to accept new incoming packets. In other words, the packet buffer 140 will never be filled up to its capacity, thus avoiding loss of incoming packets. The traffic of high-priority packets is transported at a satisfactory CIR, since low-priority packet traffic is not allowed to occupy the packet buffer 140.

The start threshold and stop threshold mentioned above may be determined according to, for example, the number of priority classes, and the input and output ratios of packet data of each priority level.

Variation of First Embodiment

This section describes a variation of the foregoing first embodiment. Since this variation is based on the first embodiment, the following description will focus on their differences, while affixing like reference numerals to like elements. Briefly stated, the station 100 according to the present variation is configured to discard all the stored data in the packet buffer 140 when it exceeds a start threshold, unlike the original station 100 (FIG. 3) of the first embodiment.

Figure 26:
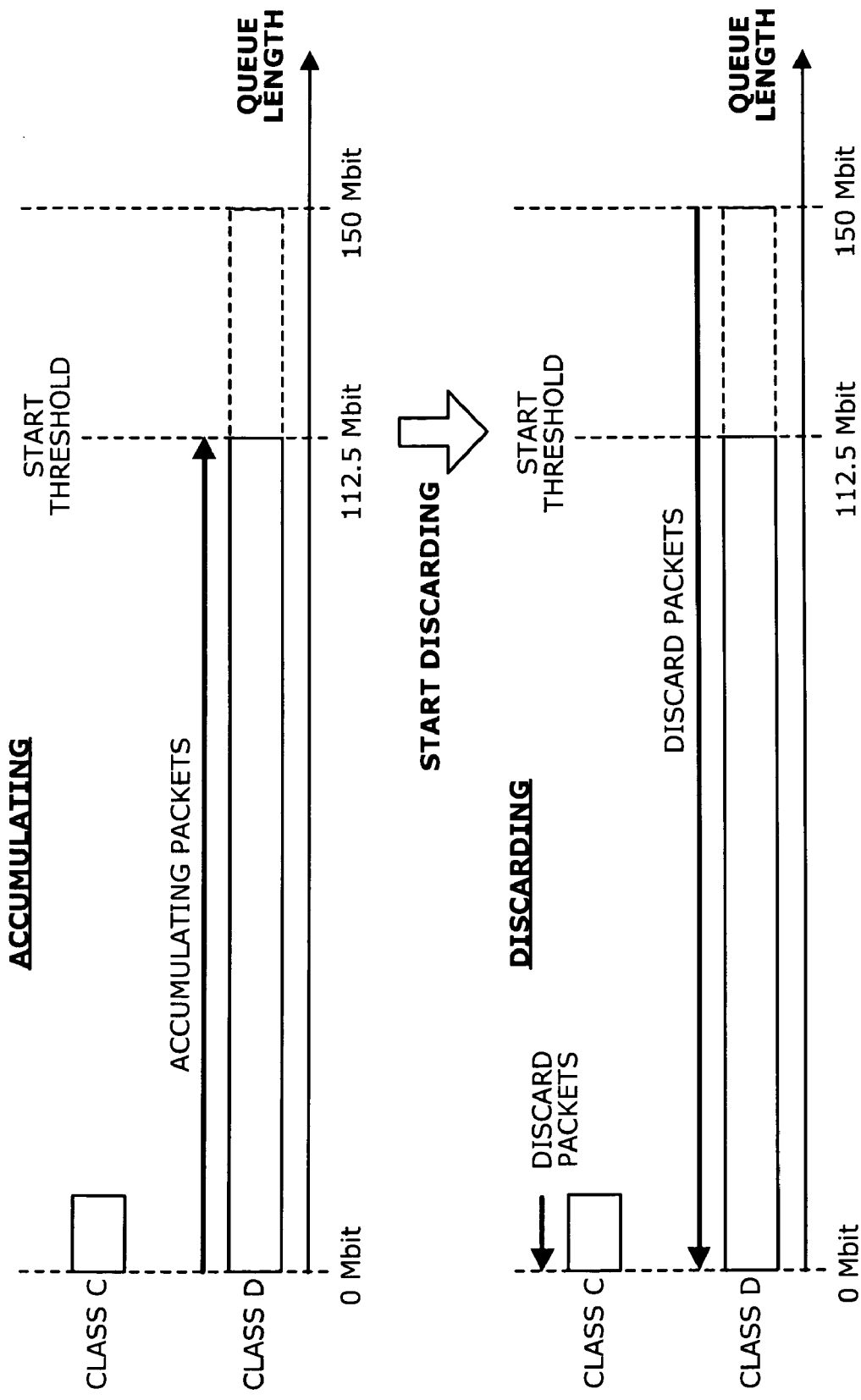
FIG. 26 illustrates queue lengths in a packet buffer when packets are discarded according to a variation of the first embodiment.

FIG. 26 illustrates queue lengths in a packet buffer when packets are discarded in this variation of the first embodiment. Suppose that the packet buffer 140 (FIG. 3) stores packet data of a particular priority class (e.g., class D). When the amount of stored data exceeds a start threshold, the station 100 begins discarding all the data in the packet buffer 140 to create a free space.

If the packet buffer 140 allowed such packets of a particular class to occupy its storage space, it would be hard for the station 100 to control packet flows based on their priorities or to fulfill a specified CIR. To address this problem, the present variation modifies the discard controller 135 (FIG. 5) Specifically, when the capacity monitor 136 outputs capacity information indicating that the packet buffer 140 has hit the start threshold, the discard controller 135 clears counters in the capacity monitor 136 (FIG. 6). In addition, the discard controller 135 initializes the top address management memory 134b (FIG. 5), end address management memory 134c (FIG. 5), vacancy management memory 134d (FIG. 5), and address chain management memory 134e (FIG. 5). By so doing, the discard controller 135 discards all the data stored in the packet buffer 140.

Note that the capacity monitor 136, top address management memory 134b, end address management memory 134c, vacancy management memory 134d, and address chain management memory 134e serve collectively as management information for the packet buffer 140. That is, the management information describes what is stored where in the packet buffer 140.

In the case where the station 100 receives incoming packet traffic in excess of outgoing packet traffic, the queue length of the packet buffer 140 keeps growing in the way illustrated in the upper half of FIG. 26 until it reaches a start threshold (e.g., 112.5 Mbit). The station 100 of the present variation then performs discard operation to reduce the queue length as in the lower half of FIG. 26. This discard operation nullifies all the existing packet data in the packet buffer 140, regardless of their priority classes. The discard operation, however, may not necessarily clear out the existing contents of the packet buffer 140. The entire data in the packet buffer 140 can be discarded at once by initializing the aforementioned four management memories.

As can be seen from the above, the present variation discards all packet data stored in the packet buffer 140 by clearing counters in the capacity monitor 136 and resetting the management memories, without the need for invoking read operations of the packet buffer 140. This feature of the present variation quickly empties the packet buffer 140 to create a maximum free space, thereby avoiding exhaustion of storage areas and consequent loss or denial of received packets. In other words, the present variation ensures that the packet buffer 140 can accept every new incoming packet.

Discard operation is triggered in the case where the amount of stored packet data belonging to a particular priority class exceeds a predetermined start threshold. Accordingly, the station 100 prevents its packet buffer 140 from being occupied by the packets of that class. It is therefore ensured that the packet buffer 140 is always ready to accept incoming packets belonging to a higher priority class, thus satisfying its specified CIR. The start threshold mentioned above may be determined according to, for example, the number of priority classes, and the input and output ratios of packet data of each priority level.

Second Embodiment

This section describes a second embodiment. Since the second embodiment shares several common elements with the first embodiment, the following description will focus on their differences, while affixing like reference numerals to like elements.

Briefly stated, the second embodiment offers a station 2100 with a time slot manager 2137 that provides a time slot for use in discarding data, in addition to those for reading data. Unlike the first embodiment, a discard controller 2135 according to the second embodiment uses this discard time slot to dispose of packet data. The following will describe this station 2100 according to the second embodiment.

Figure 27:
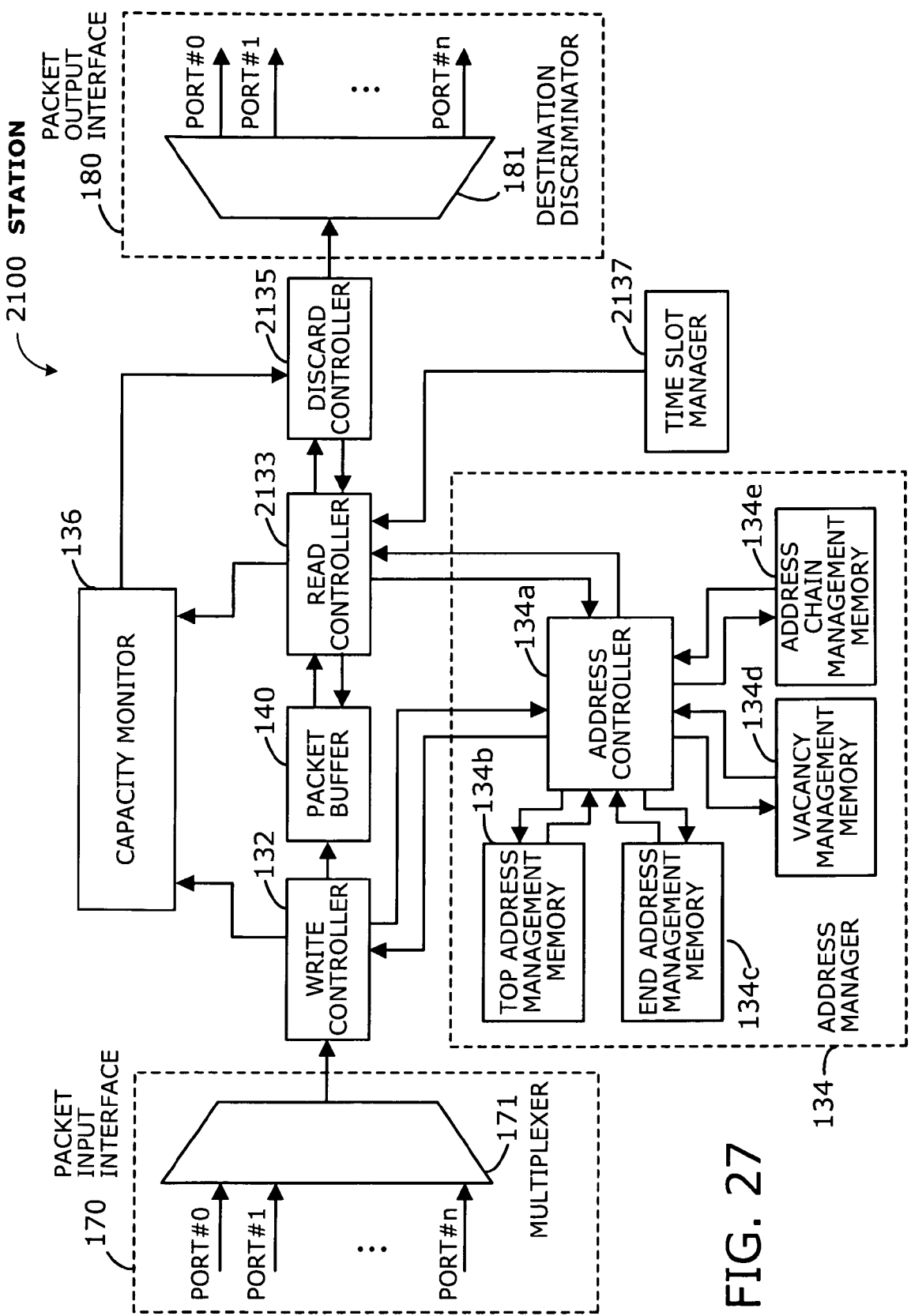
FIG. 27 a functional block diagram of a station according to a second embodiment.

FIG. 27 a functional block diagram of a station according to the second embodiment. The illustrated station 2100 includes a packet buffer 140 as temporary storage of transmit data. To prevent overflow of this packet buffer 140, the station 2100 has a write controller 132, an address manager 134, a capacity monitor 136, a packet input interface 170, a packet output interface 180, a read controller 2133, a discard controller 2135, and a time slot manager 2137.

Similarly to the first embodiment, the address manager 134 is formed from an address controller 134a, a top address management memory 134b, an end address management memory 134c, a vacancy management memory 134d, and an address chain management memory 134e. The packet input interface 170 includes a multiplexer 171, while the packet output interface 180 includes a destination discriminator 181.

The write controller 132, as in the first embodiment, performs write operations to the packet buffer 140 to store data that the station 2100 has received. Upon receipt of a packet, the write controller 132 informs the address controller 134a of the received packet. This receive packet information includes destination physical port ID, packet size, and the like. The address controller 134a provides a write address indicating a free space in the packet buffer 140, thus permitting the write controller 132 to write the received data in that space.

The address controller 134a, as in the first embodiment, controls the top address management memory 134b, end address management memory 134c, vacancy management memory 134d, and address chain management memory 134e, so as to manage write and read addresses indicating which memory areas to write or read, as well as providing such address information to other functional blocks of the station 2100.

The top address management memory 134b, as in the first embodiment, stores address values indicating a storage location of the top packet of each series of packets classified by their destination physical ports and priorities.

The end address management memory 134c, as in the first embodiment, stores address values indicating a storage location of the last packet of each series of packets classified by their destination physical ports and priorities.

The vacancy management memory 134d stores address values indicating which storage areas are vacant (or available for use), as it does in the first embodiment.

The address chain management memory 134e stores a chain of addresses of packet data stored in the packet buffer 140 as it does in the first embodiment. An address chain indicates which packets (and their data) are linked in what order. The address chain management memory 134e manages such address chains for each destination and priority class.

The capacity monitor 136, as in the first embodiment, watches the packet buffer 140 to observe the amount of stored data on the basis of combinations of priority class and output port. The capacity monitor 136 provides the discard controller 2135 with the observed values as capacity information. The discard controller 2135 initiates discard operations based on this capacity information.

The packet buffer 140 is a memory for storing data of received packets, as it is in the first embodiment. More specifically, the packet buffer 140 serves as temporary storage for the data that the station 2100 has received. Received data is written in the packet buffer 140 under the control of the write controller 132 and maintained therein until it is read out by the read controller 2133. This packet buffer 140 is implemented by using SRAM memories or like devices with sufficiently fast access time with respect to packet transmission rates.

The packet input interface 170, as in the first embodiment, has a multiplexer 171 to collect incoming packets from multiple physical ports (port #0 to port #n) and multiplex them into a single stream. This multiplexed packet stream is then passed to the write controller 132.

The packet output interface 180, as in the first embodiment, has a destination discriminator 181 to discriminate individual output packets read out of the packet buffer 140. The destination discriminator 181 distributes each packet to one of the (n+1) physical ports (port #0 to port #n) corresponding to its destination.

The read controller 2133 reads packet data out of the packet buffer 140 when transmitting or discarding packets. The address controller 134a provides the read controller 2133 with a read address for this read operation. To read data from the packet buffer 140, the read controller 2133 uses a time slot assigned by the time slot manager 2137.

With the above-described mechanism, the data received by the station 2100 stays temporarily in the packet buffer 140 before it is transmitted from the station 2100. The transmitted data is delivered to its destination terminal through the communication system (see FIG. 2) to which the station 2100 is attached.

The discard controller 2135 receives capacity information from the capacity monitor 136. Based on this capacity information, the discard controller 2135 monitors the amount of data stored in the packet buffer 140 for each port and priority class. If the amount of stored data exceeds a predetermined threshold, the discard controller 2135 discards data read out of the packet buffer 140, thereby increasing free space in the packet buffer 140. The discard controller 2135 performs this discard operation by requesting the read controller 2133 to use a discard slot when reading specified data. With this feature, the station 2100 can discard packets while executing its normal tasks of transmitting packets.

To discard packet data, the read controller 2133 reads it from the packet buffer 140 by using a discard slot, which is then discarded by the discard controller 2135, without being transmitted via physical ports of the packet output interface 180.

Every packet has been assigned a specific priority class and a specific output port. In the case where the packet buffer 140 lacks sufficient free space, and if all pieces of data stored in the packet buffer 140 have the same priority, the discard controller 2135 discards the entire data in the packet buffer 140. More specifically, the discard controller 2135 examines the amount of stored data classified by priority class and output port, thus determining whether the observed amount exceeds a predetermined threshold. If the threshold is exceeded with respect to a specific combination of priority class and output port, the discard controller 2135 begins discarding the data corresponding to that combination.

The discard controller 2135 may use two different thresholds for discard operations. One is a start threshold at which the discard controller 2135 starts discarding data, and the other is a stop threshold at which the discard controller 2135 stops discarding data. The stop threshold is smaller than the start threshold. Discard operation nullifies packet data in the order they have arrived. In other words, the earliest data will be discarded first.

The time slot manager 2137 assigns time slots, which are defined by dividing the time axis by a specific interval. According to the second embodiment, those time slots include output slots and discard slots. The time slot manager 2137 assigns such time slots for use in reading and/or discarding data. More specifically, the output slots are assigned to packets that will be transmitted from the packet output interface 180. The discard slot is assigned to packets subject to disposal.

In operation of the station 2100 according to the present embodiment, the packet input interface 170 receives multiple incoming packets, and the write controller 132 writes them into the packet buffer 140 in the same way as they do in the first embodiment. The capacity monitor 136 constantly watches read and write operations to the packet buffer 140, thus monitoring, for example, the amount of data stored therein, with respect to each output port and each priority class. The time slot manager 2137 specifies time slots (output and discard slots) for use by the read controller 2133. If the amount of data corresponding to a specific output port and priority class exceeds a start threshold, the discard controller 2135 begins discard operations in the following way.

First, the discard controller 2135 commands the read controller 2133 to read specified data out of the packet buffer 140 for discard operation. The read controller 2133 then requests the address controller 134a to provide address information indicating where in the packet buffer 140 the specified data is stored. The read controller 2133 makes this request in the same way as it usually does for other data. Upon receipt of address information, the read controller 2133 supplies the address to the packet buffer 140, thus initiating a read operation for the specified data. Upon receipt of the requested data from the packet buffer 140, the read controller 2133 inserts that data to a discard slot assigned by the time slot manager 2137. The packet output interface 180 at the subsequent stage disregards data contained in this discard slot.

FIG. 28 illustrates input and output link bandwidths of the station 2100 according to the second embodiment. The packet input interface 170 (FIG. 27) has (n+1) physical ports (port #0 to port #n), as does the packet output interface 180 (FIG. 27). It is assumed that packets are assigned either of four priority classes (class A to class D). It is also assumed that each physical port #0 to #n provides a transmission rate (link bandwidth) of 1 Gbps.

The bandwidth of each physical input port of the packet input interface 170 is shared evenly by four priority classes A to D. This means that each physical input port offers a bandwidth of 250 Mbps for every class.

The input link bandwidth is defined as a total capacity of priority classes that the physical input ports of the packet input interface 170 serve. Since each physical input port operates at a transmission rate of 1 Gbps, the input link bandwidth in the present case is: 1 Gbps×(n+1)=(n+1) Gbps.

Likewise, the output link bandwidth is defined as a total capacity of priority classes that the physical output ports of the packet output interface 180 serve. Since each physical output port operates at a transmission rate of 1 Gbps, the input link bandwidth in the present case is: 1 Gbps×(n+1)=(n+1) Gbps.

Further assuming that the discard port has a bandwidth of 1 Gbps (see discard port bandwidth 2138 in FIG. 29), the total bandwidth of the physical output ports and discard port is (n+2) Gbps.

Figure 29:
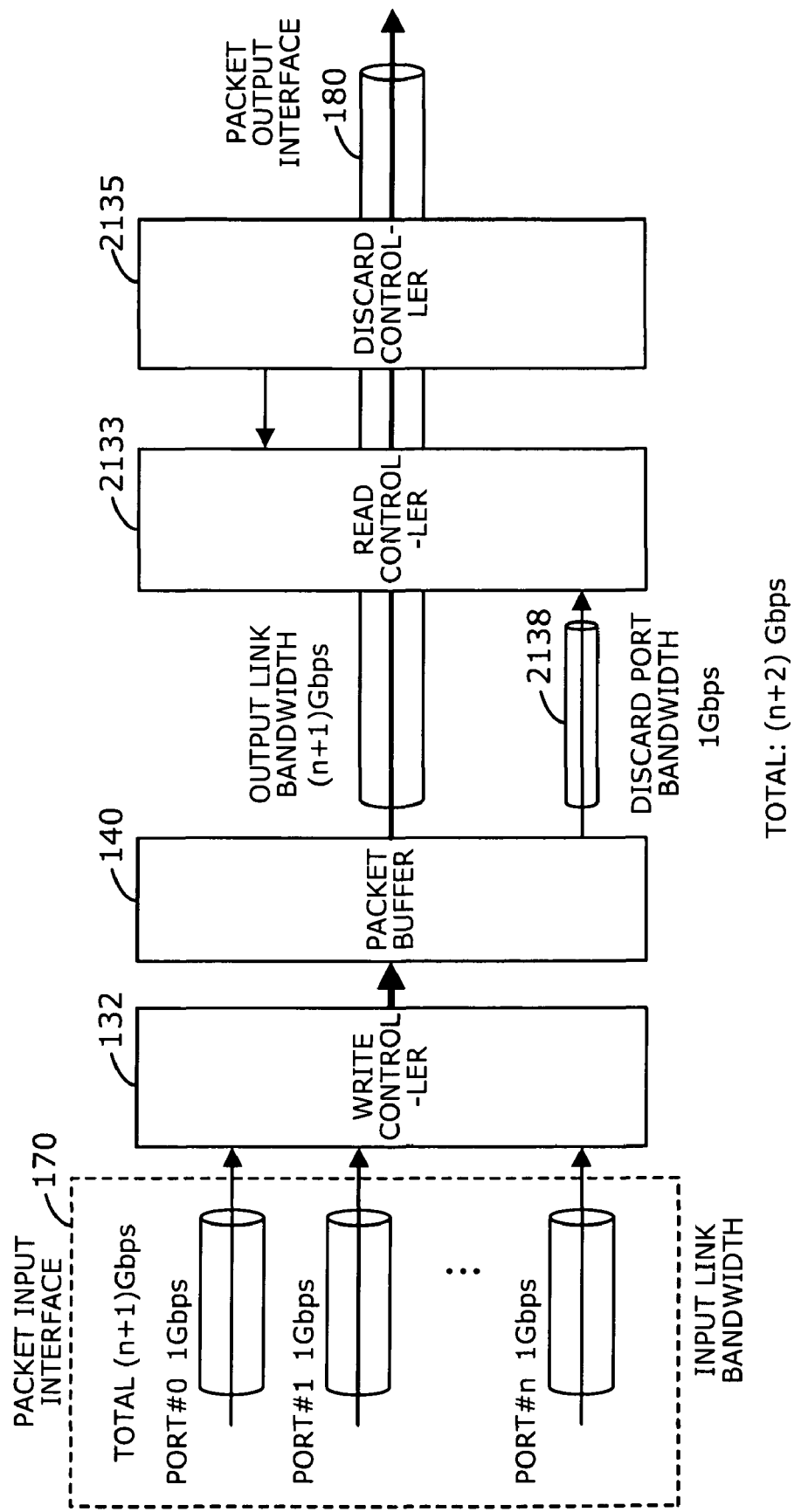
FIG. 29 illustrates how a discard port operates in the second embodiment.

FIG. 29 illustrates how a discard port operates in the second embodiment. As mentioned above, the station 2100 of the second embodiment includes a write controller 132, a packet buffer 140, a packet input interface 170, a packet output interface 180, a read controller 2133, and a discard controller 2135. The station 2100 reads and discards stored packet data having a specific priority class and destination port when the amount of that data exceeds a predetermined threshold. According to the present embodiment, the station 2100 performs this discard operation by using a discard port bandwidth 2138 dedicated for that purpose. In other words, the station 2100 uses a discard slot, i.e., the time slot providing the discard port bandwidth 2138.

The discard port bandwidth 2138 refers to a logical output port to which no physical communication links are attached. As mentioned, this discard port bandwidth 2138 is assumed to be 1 Gbps. Normally, every piece of packet data in the packet buffer 140 goes out of the station 2100 via either physical port of the packet output interface 180. The discard port bandwidth 2138 is not used in such normal situations.

As FIG. 28 illustrates, the packet input interface 170 has (n+1) physical ports (port #0 to port #n). In the case where, for example, each physical port operates at a transmission rate of 1 Gbps, the input link bandwidth of the station 2100 amounts to (n+1) Gbps. This means that the write controller 132 may write data in the packet buffer 140 at the rate of (n+1) Gbps.

While not illustrated, the station 2100 has an output link bandwidth of (n+1) Gbps. More specifically, the packet output interface 180 has (n+1) physical ports (see FIG. 27), each operating at 1 Gbps, as illustrated in FIG. 28. Accordingly, the output link bandwidth of the station 2100 amounts to (n+1) Gbps. This is similar to the foregoing input link bandwidth.

FIG. 28 also illustrates a discard port bandwidth 2138 equivalent to a transmission rate of 1 Gbps. Accordingly, the output data rate of the packet buffer 140 amounts to (n+2) Gbps when the read controller 2133 performs read operations under the control of the discard controller 2135.

Suppose, for example, that the packet input interface 170 has four physical ports each operating at a transmission rate of 1 Gbps. The packet input interface 170 accepts incoming packet traffic of up to 4 Gbps. Likewise, in the case where the packet output interface 180 has four physical ports each operating at a transmission rate of 1 Gbps, the total output bandwidth amounts to 5 Gbps, including a discard port bandwidth 2138 of 1 Gbps. Data directed to the discard port, however, will not appear at any physical port of the packet output interface 180 since such data is discarded within the station 2100.

As can be seen from the above example, the input link bandwidth of the station 2100 is smaller than the sum of output link bandwidth and discard bandwidth. This means that the amount of outgoing or discarded data per unit time is greater than the amount of incoming data per unit time. Accordingly, the proposed station 2100 can discard excessive packets while transmitting other packets.

The foregoing first embodiment does not permit outgoing packets to be transmitted during discard operations. Suppose, for example, the packet buffer 140 contains many Ethernet (Registered Trademark) packets with a length of 64 bytes. In this case, the discard operation takes a long time since the amount of data is reduced by only 64 bytes per single read operation. During that time, the station is unable to output other packets.

Even in such a situation, the second embodiment reserves a certain amount of bandwidth for a discard port, so that the sum of output bandwidth and this discard bandwidth will be greater than the input bandwidth. Accordingly, the station can transmit packets by using the dedicated output bandwidth, while being prepared for an excessive increase of packets in the packet buffer 140.

Figure 30:
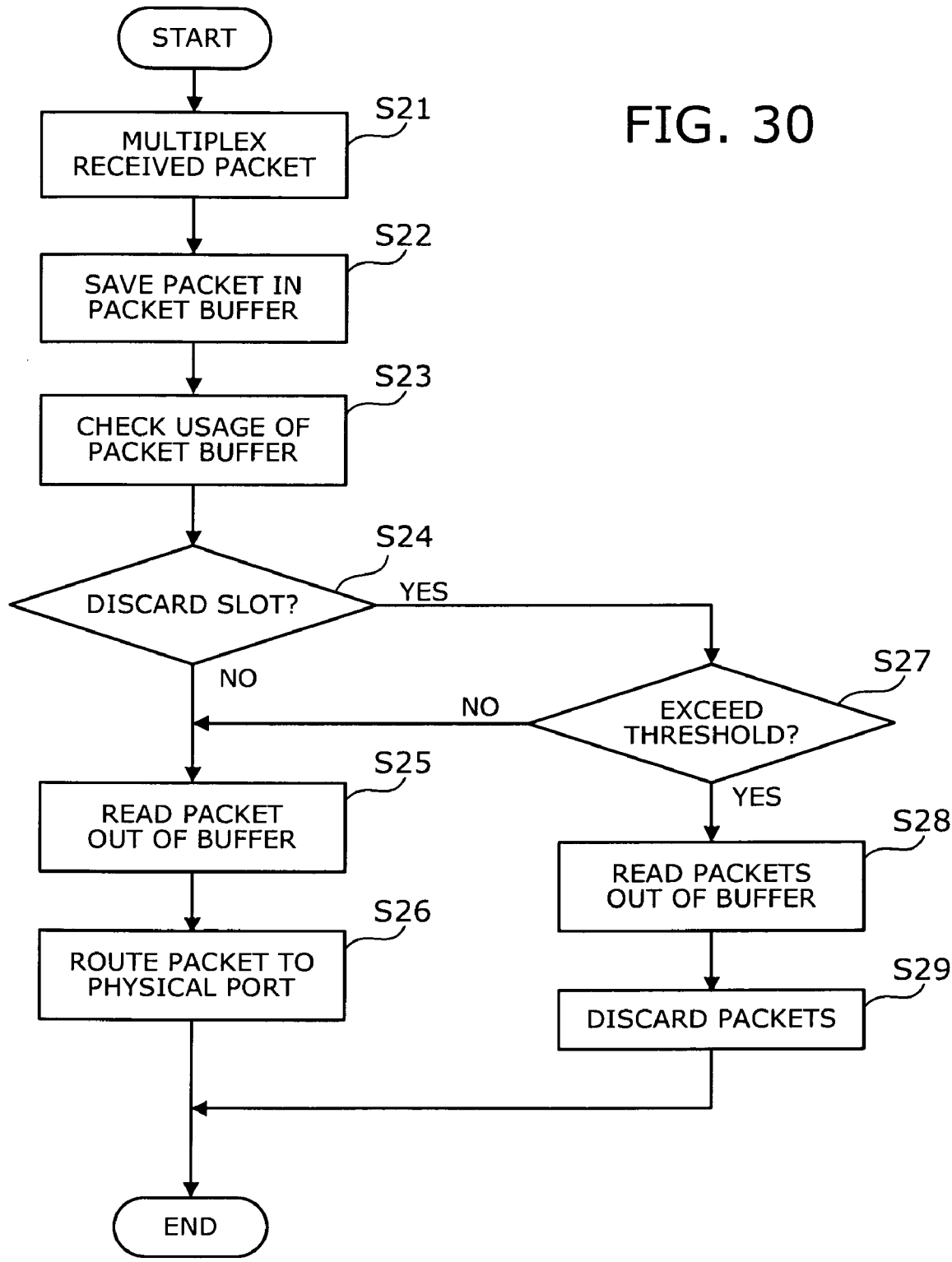
FIG. 30 is a flowchart of a discard control process according to the second embodiment.

FIG. 30 is a flowchart of a discard control process according to the second embodiment. The station 2100 of the second embodiment performs write operations to the packet buffer 140 to store data of incoming packets that have arrived at its physical ports, similarly to the station 100 of the first embodiment. The packet buffer 140 accumulates those received packets. A discard control process is invoked each time a new packet arrives at the station 2100, as in the first embodiment, so as to check the current state of the packet buffer 140 and determine whether to discard stored packets.

Unlike the first embodiment, the read controller 2133 of the second embodiment operates on a time slot basis, and a discard operation occurs only on a discard slot (i.e., special time slot for the aforementioned discard port) in the case where the amount of stored data exceeds a start threshold. For the other time slots (output time slots), the read controller 2133 performs ordinary read operations for data transmission purposes.

(Step S21) As each incoming packet arrives at a physical input port (e.g., ports #0 to #n of packet input interface 170 illustrated in FIG. 27), the station 2100 multiplexes the received packet with other packets.

(Step S22) The station 2100 extracts data from the packet multiplexed at step S21 and saves the extracted data in the packet buffer 140.

(Step S23) The station 2100 checks the current usage of the packet buffer 140, thus determining, on an individual priority bases, how much data is stored in the packet buffer 140.

(Step S24) The station 2100 determines whether the time slot assigned to the read controller 2133 at the moment is a discard slot or an output slot. According to the second embodiment, the read controller 2133 operates on the basis of time slots assigned by the time slot manager 2137 (FIG. 27). "Output slot" refers to a time slot used to transmit packet data through the packet output interface 180. "Discard slot" refers to a time slot corresponding to the discard port bandwidth 2138 (FIG. 29). If the assigned time slot is a discard slot, then the station 2100 advances the process to step S27. If the assigned time slot is an output slot, then the station 2100 advances the process to step S25.

(Step S25) The station 2100 reads packet data out of the packet buffer 140.

(Step S26) The station 2100 routes the packet data read at step S25 to an appropriate physical port of the packet output interface 180 (FIG. 27) according to the packet's destination, thereby transmitting the packet through that physical port. The station 2100 then exits from the process of FIG. 30.

(Step S27) The station 2100 determines whether the buffer usage obtained at step S23 exceeds a predetermined threshold. If so, the station 2100 advances the process to step S28. If not, the station 2100 proceeds to step S25.

The determination at this step S27 is performed for each combination of physical port and priority class. If the determination result for a particular port-priority combination is positive, then the stored packets that fall within that combination will be discarded one by one. More specifically, the current usage of the packet buffer 140 is examined for every possible combination of physical port and priority class, beginning with that of port #0 and class A. If an excessive usage is found with respect to, for example, the class-A packet data to be transmitted from port #0, those packets are subjected to discard operation.

(Step S28) The station 2100 reads packet data out of the packet buffer 140 and inserts it into the discard slot.

(Step S29) The station 2100 discards the data in the discard slot. The station 2100 then exits from the process of FIG. 30.

As can be seen from the above steps, the second embodiment enables the station to keep transmitting packets, while being prepared for an excessive increase of packets in the packet buffer 140.

Third Embodiment

This section describes a third embodiment. Since the third embodiment shares several common elements with the first embodiment, the following description will focus on their differences, while affixing like reference numerals to like elements.

Briefly stated, the difference between the first and third embodiments is twofold. First, the third embodiment employs additional buffers in a packet output interface 3180 to temporarily accommodate output packets (see FIG. 32, port#0 buffer 3182a to port#n buffer 3182n). Second, the third embodiment has a clock rate controller 3139 to accelerate the operation of a read controller 3133, discard controller 3135, and packet output interface 3180. The following will describe a station 3100 according to the third embodiment.

Figure 31:
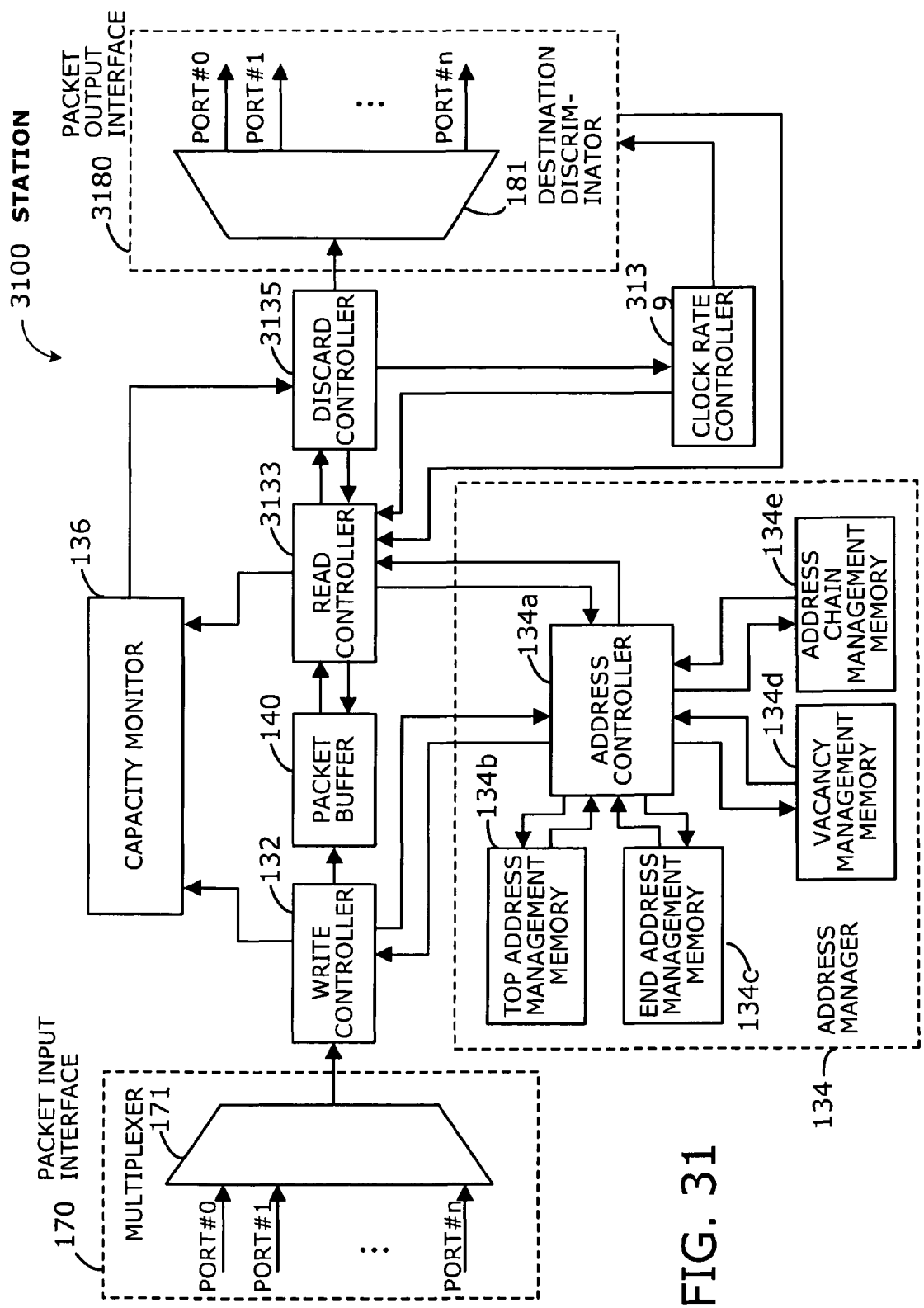
FIG. 31 is a functional block diagram of a station according to a third embodiment.
Figure 32:
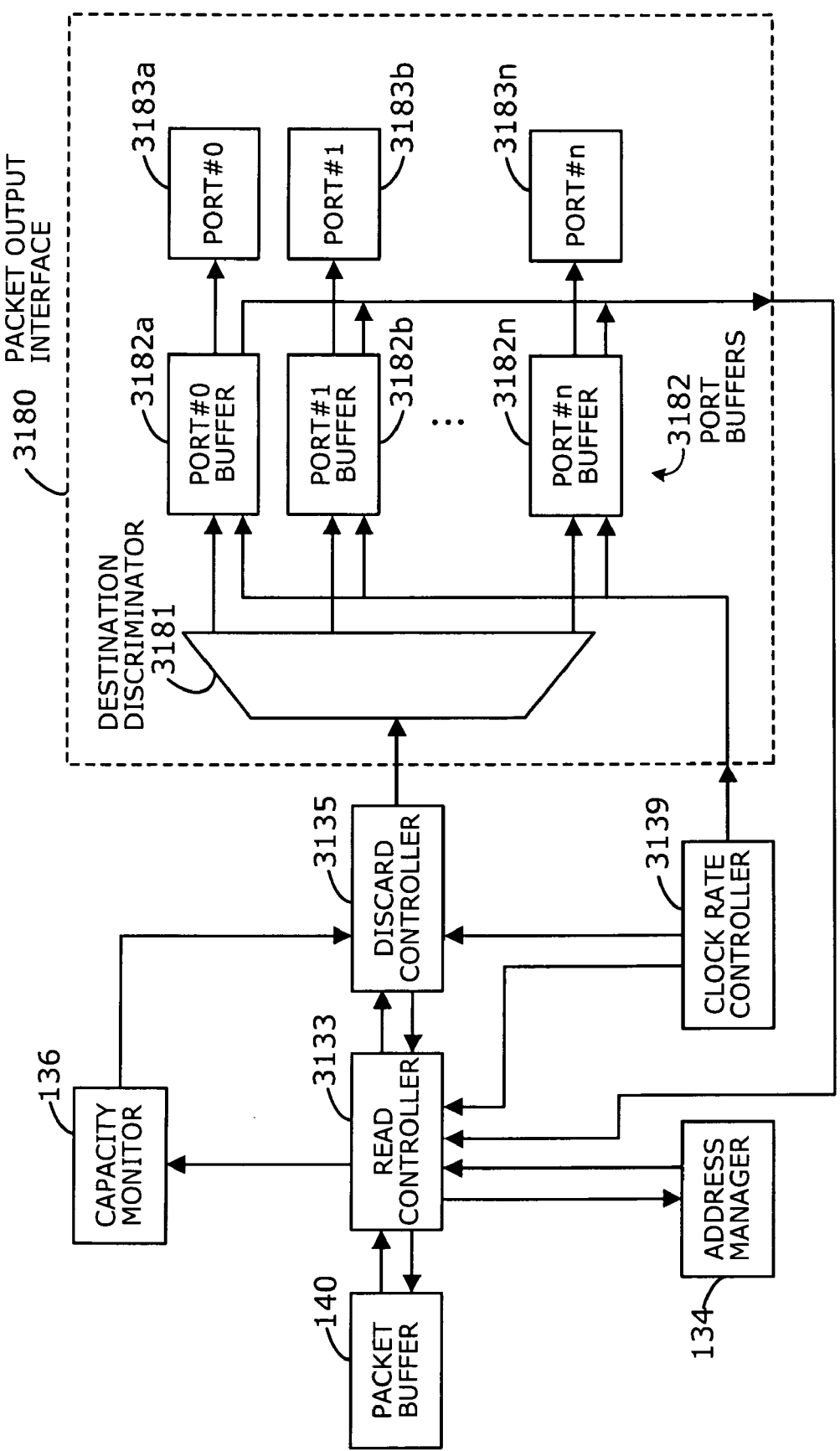
FIG. 32 is a functional block diagram of a packet output interface according to the third embodiment.

FIG. 31 is a functional block diagram of a station according to the third embodiment, and FIG. 32 gives details of its packet output interface. The illustrated station 3100 includes a packet buffer 140 as temporary storage of transmit data. To prevent overflow of this packet buffer 140, the station 3100 has a write controller 132, an address manager 134, a capacity monitor 136, a packet input interface 170, a read controller 3133, a discard controller 3135, a clock rate controller 3139, and a packet output interface 3180.

Similarly to the first embodiment, the address manager 134 is formed from an address controller 134a, a top address management memory 134b, an end address management memory 134c, a vacancy management memory 134d, and an address chain management memory 134e. The packet input interface 170 includes a multiplexer 171, while the packet output interface 3180 includes a destination discriminator 3181.

The write controller 132, as in the first embodiment, performs write operations to the packet buffer 140 to store data that the station 3100 has received. Upon receipt of a packet, the write controller 132 informs the address controller 134a of the received packet. This receive packet information includes destination physical port ID, packet size, and the like. The address controller 134a provides a write address indicating a free space in the packet buffer 140, thus permitting the write controller 132 to write the received data in that space.

The address controller 134a, as in the first embodiment, controls the top address management memory 134b, end address management memory 134c, vacancy management memory 134d, and address chain management memory 134e, so as to manage write and read addresses indicating which memory areas to write or read, as well as providing such address information to other functional blocks of the station 3100.

The top address management memory 134b, as in the first embodiment, stores address values indicating a storage location of the top packet of each series of packets classified by their destination physical ports and priorities.

The end address management memory 134c, as in the first embodiment, stores address values indicating a storage location of the last packet of each series of packets classified by their destination physical ports and priorities.

The vacancy management memory 134d stores address values indicating which storage areas are vacant (or available for use), as it does in the first embodiment.

The address chain management memory 134e stores a chain of addresses of packet data stored in the packet buffer 140 as it does in the first embodiment. An address chain indicates which packets (and their data) are linked in what order. The address chain management memory 134e manages such address chains for each destination and priority class.

The capacity monitor 136, as in the first embodiment, watches the packet buffer 140 to observe the amount of stored data on the basis of combinations of priority class and output port. The capacity monitor 136 provides the discard controller 3135 with the observed values as capacity information. The discard controller 3135 initiates discard operations based on this capacity information.

The packet buffer 140 is a memory for storing data of received packets, as it is in the first embodiment. More specifically, the packet buffer 140 serves as temporary storage for the data that the station 3100 has received. Received data is written in the packet buffer 140 under the control of the write controller 132 and maintained therein until it is read out by the read controller 3133. This packet buffer 140 is implemented by using SRAM memories or like devices with sufficiently fast access time with respect to packet transmission rates.

The packet input interface 170, as in the first embodiment, has a multiplexer 171 to collect incoming packets from multiple physical ports (port #0 to port #n) and multiplex them into a single stream. This multiplexed packet stream is then passed to the write controller 132.

The read controller 3133 reads packet data out of the packet buffer 140 when transmitting or discarding packets. The address controller 134a provides the read controller 3133 with a read address for this read operation.

With the above-described features, the data received by the station 3100 stays temporarily in the packet buffer 140 before it is transmitted from the station 3100. The transmitted data is delivered to its destination terminal through the communication system (see FIG. 2) to which the station 3100 is attached.

According to the present embodiment, the read controller 3133 reads the packet buffer 140 at twice the rate of write operations, and the read data is transferred to port#0 buffer 3182a to port#n buffer 3182n (collectively referred to as "port buffers 3182") that correspond to individual physical ports #0 to #n of the packet output interface 3180. The read controller 3133 observes the amount of data stored in each port buffer 3182. If the observed amount of data stored in one of those port buffers 3182 exceeds a predetermined threshold, the read controller 3133 directs subsequent data to an alternative port whose corresponding buffer usage is below the threshold.

The discard controller 3135 receives capacity information from the capacity monitor 136. Based on this capacity information, the discard controller 3135 monitors the amount of data stored in the packet buffer 140 on an individual port and priority basis. If the amount of stored data exceeds a predetermined threshold, the discard controller 2135 discards data read out of the packet buffer 140, thereby increasing free space in the packet buffer 140.

In discard operations, the read controller 3133 reads out packet data from the packet buffer 140, which is then discarded by the discard controller 3135, without being transmitted from physical ports of the packet output interface 3180.

Every packet has been assigned a specific priority class and a specific output port. In the case where the packet buffer 140 lacks sufficient free space, and if all pieces of data stored in the packet buffer 140 have the same priority, the discard controller 3135 discards the entire data in the packet buffer 140. More specifically, the discard controller 3135 observes the amount of stored data classified by priority class and output port, thus determining whether the observed amount exceeds a predetermined threshold. If the threshold is exceeded with respect to a specific combination of priority class and output port, the discard controller 3135 discards the data corresponding to that combination.

The discard controller 3135 may use two different thresholds for discard operations. One is a start threshold at which the discard controller 3135 starts discarding data, and the other is a stop threshold at which the discard controller 3135 stops discarding data. The stop threshold is smaller than the start threshold. Discard operation nullifies packet data in the order they have arrived. In other words, the earliest data will be discarded first.

The clock rate controller 3139 controls "read data rate," the rate at which the read controller 3133 reads out data out of the packet buffer 140. The clock rate controller 3139 also controls "discard rate," the rate at which the discard controller 3135 discard data. The clock rate controller 3139 further controls "write rate," i.e., the rate at which data is written in the port buffers 3182. According to the present embodiment, the clock rate controller 3139 sets a faster rate to those read, discard, and write rates, relative to the rate at which the received data is written in the packet buffer 140. For example, the former three rates may be twice as fast as the latter rate.

To output packets, the packet output interface 3180 includes a destination discriminator 3181, a plurality of physical ports (port #0 3183a, port #1 3183b, ... port #n 3183n), and a plurality of port buffers 3182 (port#0 buffer 3182a to port#n buffer 3182n). The packet output interface 3180 has a destination discriminator 181 to discriminate each output packet read out of the packet buffer 140. The destination discriminator 181 distributes each packet to one of the (n+1) physical ports (port #0 to port #n) corresponding to its respective destination.

The port buffers 3182 are first-in first-out (FIFO) memories each coupled to an individual physical output port of the packet output interface 3180. Those port buffers 3182 serve as temporary storage for the data read out of the packet buffer 140 under the control of the read controller 3133. The data stays there until it is transmitted from the packet output interface 3180.

As can be seen from the above description, the read controller 3133 of the third embodiment monitors vacancy status of each port buffer 3182 and directs a packet to its destination port if the corresponding port buffer has sufficient free space. The intended buffer may, however, lack sufficient free space. In that case, the read controller 3133 seeks other ports having vacancies and routes the packet to one of such ports if available.

Figure 33:
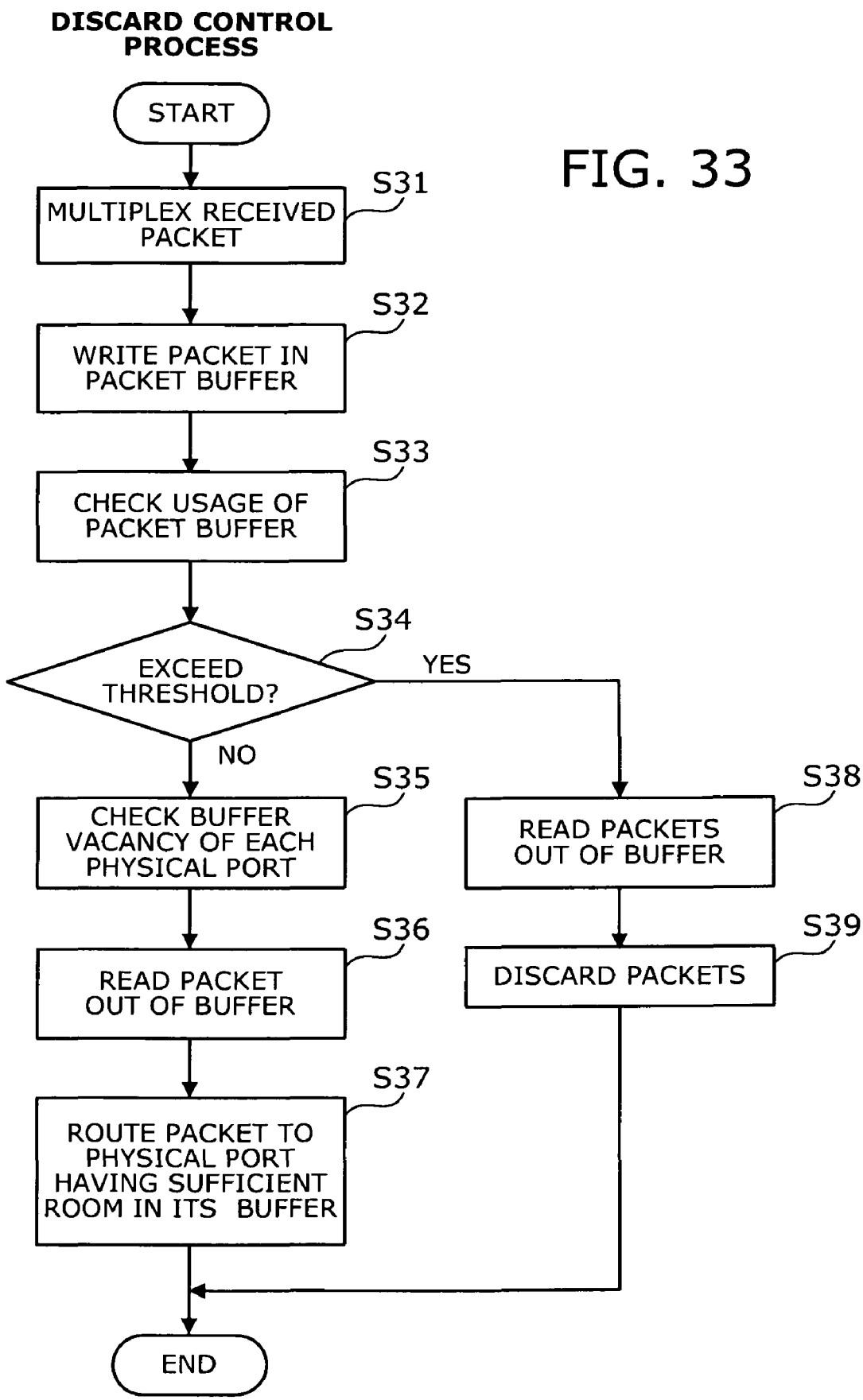
FIG. 33 is a flowchart of a discard control process according to the third embodiment.
Figure 34:
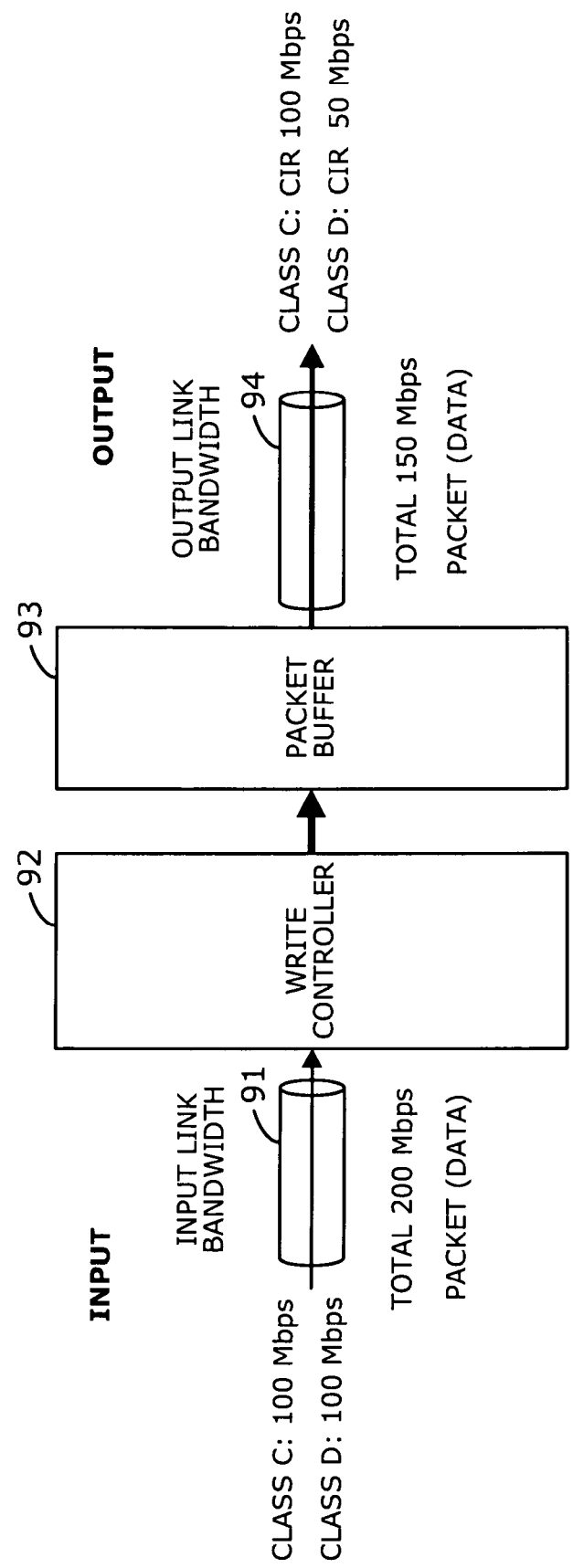
FIG. 34 illustrates a case where a guaranteed CIR cannot be maintained in a conventional system because of its lack of packet discard functions.

FIG. 33 is a flowchart of a discard control process according to the third embodiment. The station 3100 of the third embodiment performs write operations to the packet buffer 140 to store data of incoming packets that have arrived at its physical ports, similarly to the station 100 (FIG. 3) of the first embodiment. The packet buffer 140 accumulates those received packets. The discard control process of the second embodiment is invoked each time a new packet arrives at the station 3100, as in the first embodiment, so as to check the current state of the packet buffer 140 and determine whether to discard the stored packets.

According to the discard control process of the third embodiment, the read controller 3133 checks the current usage of each port buffer 3182 before sending a packet. In the case where the intended buffer lacks sufficient free space, the read controller 3133 seeks an alternative port having vacancies and directs the packet to that port.

(Step S31) As each incoming packet arrives at a physical input port (e.g., ports #0 to #n of packet input interface 170 illustrated in FIG. 31), the station 3100 multiplexes the received packet with other packets.

(Step S32) The station 3100 extracts data from the packet multiplexed at step S31 and saves the extracted data in the packet buffer 140.

(Step S33) The station 3100 checks the current usage of the packet buffer 140, thus determining, on an individual priority bases, how much data is stored in the packet buffer 140.

(Step S34) The station 3100 determines whether the current usage of the packet buffer 140 exceeds a predetermined start threshold. If so, the station 3100 advances the process to step S38. If not, the station 3100 advances the process to step S35.

(Step S35) The station 3100 checks the current usage of each buffer (port#0 buffer 3182a to port#n buffer 3182n) in the packet output interface 3180 (FIG. 31). In the present example, the station 3100 performs this checking for every physical port.

(Step S36) The station 3100 reads out packet data from the packet buffer 140 at twice the rate of write operations to the same.

(Step S37) The station 3100 routes the packet data read at step S36 to the packet output interface 3180 (FIG. 31), specifying the physical port that the step S35 has discovered room in its corresponding buffer. The routed packet data is thus stored in the specified buffer before it is transmitted out of the corresponding physical port. The station 3100 then exits from the process of FIG. 33.

More specifically, the station 3100 examines relevant fields of an outgoing packet to determine which physical port to use, depending on the destination of the packet. If it is found at step S35 that the determined physical port has sufficient room in its corresponding buffer, then the station 3100 routes the packet to that port. If not, the station 3100 uses another physical port which is found at step S35 as having sufficient room in its corresponding buffer. While the read operation performed at step S36 is twice as fast as the rate of write operations, the port buffers 3182 absorb the difference between input and output data rates, thus preventing packet data from being lost.

(Step S38) The station 3100 reads out packet data from the packet buffer 140 at twice the rate of write operations to the same. This read operation is repeated until the amount of data stored in the packet buffer 140 falls below a stop threshold.

(Step S39) The station 3100 discards the data that it has read out at step S38. This discard operation can be executed quickly since the rate of read operations at step S38 is doubled. The station 3100 then exits from the process of FIG. 33.

As can be seen from the above, the third embodiment adds the feature of increased clock rates to the first embodiment, thereby enabling the packet buffer 140 to be read at twice the rate of write operation. This doubled rate of read operation shortens the time consumed to discard packets, making it possible to discard outgoing packets more efficiently. The third embodiment thus prevents buffer overflow more effectively, without increasing the costs too much.

The communication apparatus and method according to the above-described embodiments, including their variations, prevent buffer overflow effectively, without significant cost increase.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that various changes, substitutions, and alterations could be made hereto without departing from the spirit and scope of the invention.

What is claimed is:

1. A communication apparatus, comprising:
    a temporary memory to temporarily store data;
    a write controller to write received data in the temporary memory;
    a read controller to read the stored data out of the temporary memory;
    a discard controller to perform a discard operation that discards the data read out of the temporary memory; and
    a rate controller to control a discard rate at which the discard controller discards the read data, the discard rate being faster than a rate at which the received data is written in the temporary memory.

2. The communication apparatus according to claim 1, wherein the discard controller discards the data read out of the temporary memory if the amount of the data stored in the temporary memory exceeds a predetermined threshold.

3. The communication apparatus according to claim 1, wherein the discard controller subjects the entire data stored the temporary memory to the discard operation.

4. The communication apparatus according to claim 1, further comprising a time slot manager to provide time slots by dividing time axis by a fixed interval and assign the time slots for use in reading and/or discarding data,
    wherein the read controller reads the stored data out of the temporary memory by using the time slots assigned by the time slot manager, and
    wherein the discard controller commands the read controller to read specified data out of the temporary memory by using the discard slot, so as to discard the specified data.

5. The communication apparatus according to claim 1, further comprising:
    an output-side memory to store temporarily the data read out by the read controller before that data is transmitted,
    wherein the rate controller further controls a read rate at which the read controller reads data out of the temporary memory, and a write rate at which the read data is written in the output-side memory, and
    wherein the rate controller sets a faster rate to the read and write rates, relative to the rate at which the received data is written in the temporary memory.

6. The communication apparatus according to claim 1, wherein the discard controller begins the discard operation when the amount of data stored in the temporary memory exceeds a first threshold, and stops the discard operation when the amount of data stored in the temporary memory falls below a second threshold that is smaller than the first threshold.

7. The communication apparatus according to claim 1, wherein:
    each received data is assigned a priority class and an output port from which that received data is to be transmitted; and
    the discard controller observes the amount of data stored in the temporary memory which is classified by the priority class and output port assigned thereto, so as to determine whether the observed amount exceeds a predetermined threshold, and if the predetermined threshold is exceeded with respect to a specific combination of priority class and output port, subjects the data corresponding to that combination to the discard operation.

8. The communication apparatus according to claim 1, wherein the discard controller discards data in an order that the data has been written in the temporary memory.

9. The communication apparatus according to claim 5, further comprising:
    a plurality of output sections from which the read data is transmitted; and
    a plurality of the output-side memories corresponding the plurality of output sections;
    wherein the read controller observes the amount of data stored in each of the output-side memories and, if the observed amount of data in one of the output-side memories exceeds a predetermined threshold, directs subsequent data to another output section whose corresponding output-side memory stores data below the predetermined threshold.

10. The communication apparatus according to claim 3, wherein:
    each received data is assigned a priority class; and
    the discard controller observes the amount of data stored in the temporary memory which is classified by the priority class, so as to determine whether the observed amount exceeds a predetermined threshold, and if the predetermined threshold is exceeded with respect to a specific priority class, subjects all the data stored in the temporary memory to the discard operation.

11. A method for controlling a communication apparatus, the method comprising:
    writing received data in a temporary memory at a first rate;
    reading the data stored in the temporary memory;
    discarding the data read out of the temporary memory, at a second rate; and
    controlling the second rate such that the second rate is faster than the first rate.

* * * * *